(12) United States Patent
Rosenfield

(10) Patent No.: US 10,746,133 B2
(45) Date of Patent: Aug. 18, 2020

(54) ROCKET APPARATUSES, SYSTEMS AND METHODS

(71) Applicant: Gary C. Rosenfield, Washington, UT (US)

(72) Inventor: Gary C. Rosenfield, Washington, UT (US)

( * ) Notice: Subject to any disclaimer, the term of this patent is extended or adjusted under 35 U.S.C. 154(b) by 277 days.

(21) Appl. No.: 15/706,207

(22) Filed: Sep. 15, 2017

(65) Prior Publication Data

US 2018/0073466 A1    Mar. 15, 2018

Related U.S. Application Data

(60) Provisional application No. 62/395,260, filed on Sep. 15, 2016.

(51) Int. Cl.
*F02K 9/97* (2006.01)
*F02K 9/60* (2006.01)
*A63H 27/00* (2006.01)
*F02K 9/34* (2006.01)
*A63H 27/26* (2006.01)

(52) U.S. Cl.
CPC .............. *F02K 9/97* (2013.01); *A63H 27/004* (2013.01); *A63H 27/005* (2013.01); *A63H 27/06* (2013.01); *F02K 9/34* (2013.01); *F02K 9/343* (2013.01); *F02K 9/60* (2013.01); *F05D 2220/80* (2013.01); *F05D 2230/60* (2013.01); *F05D 2240/14* (2013.01); *F05D 2240/55* (2013.01); *F05D 2260/30* (2013.01)

(58) Field of Classification Search
CPC ... F02K 9/34; F02K 9/343; F02K 9/97; F02K 9/978; F42B 5/10; F42B 5/105; A63H 27/005; A63H 27/06
USPC .......................................... 102/374, 376, 377
See application file for complete search history.

(56) References Cited

U.S. PATENT DOCUMENTS

2003/0194943 A1\* 10/2003 Rowley ................ A63H 27/005
446/52
2010/0024428 A1\* 2/2010 Rosenfield ................ F02K 9/34
60/770

\* cited by examiner

*Primary Examiner* — Todd E Manahan
*Assistant Examiner* — Kyle Robert Thomas
(74) *Attorney, Agent, or Firm* — Peter B. Scull; HDC IP Law LLP

(57) ABSTRACT

A thrust ring for a rocket motor for one or more of limited re-use or single use, including a rocket motor housing, the motor housing adapted to contain propellant; an aft closure with a nozzle, the aft closure connected or connectable to the housing; a forward closure connected or connectable to the housing; wherein one or both of the aft closure and the forward closure are connectable to the housing in manner adapted for one or both of limited re-use or single use.

20 Claims, 21 Drawing Sheets

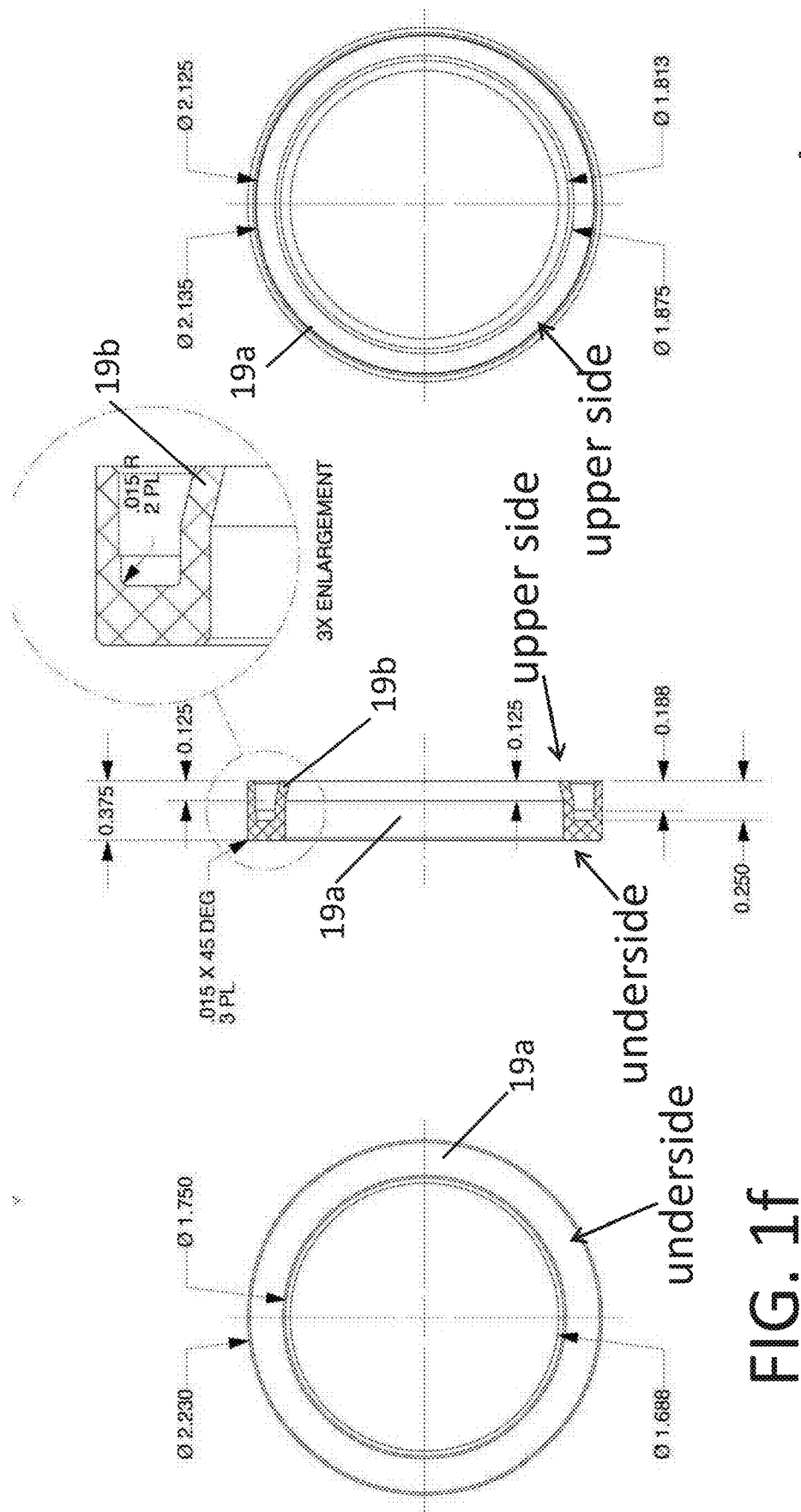

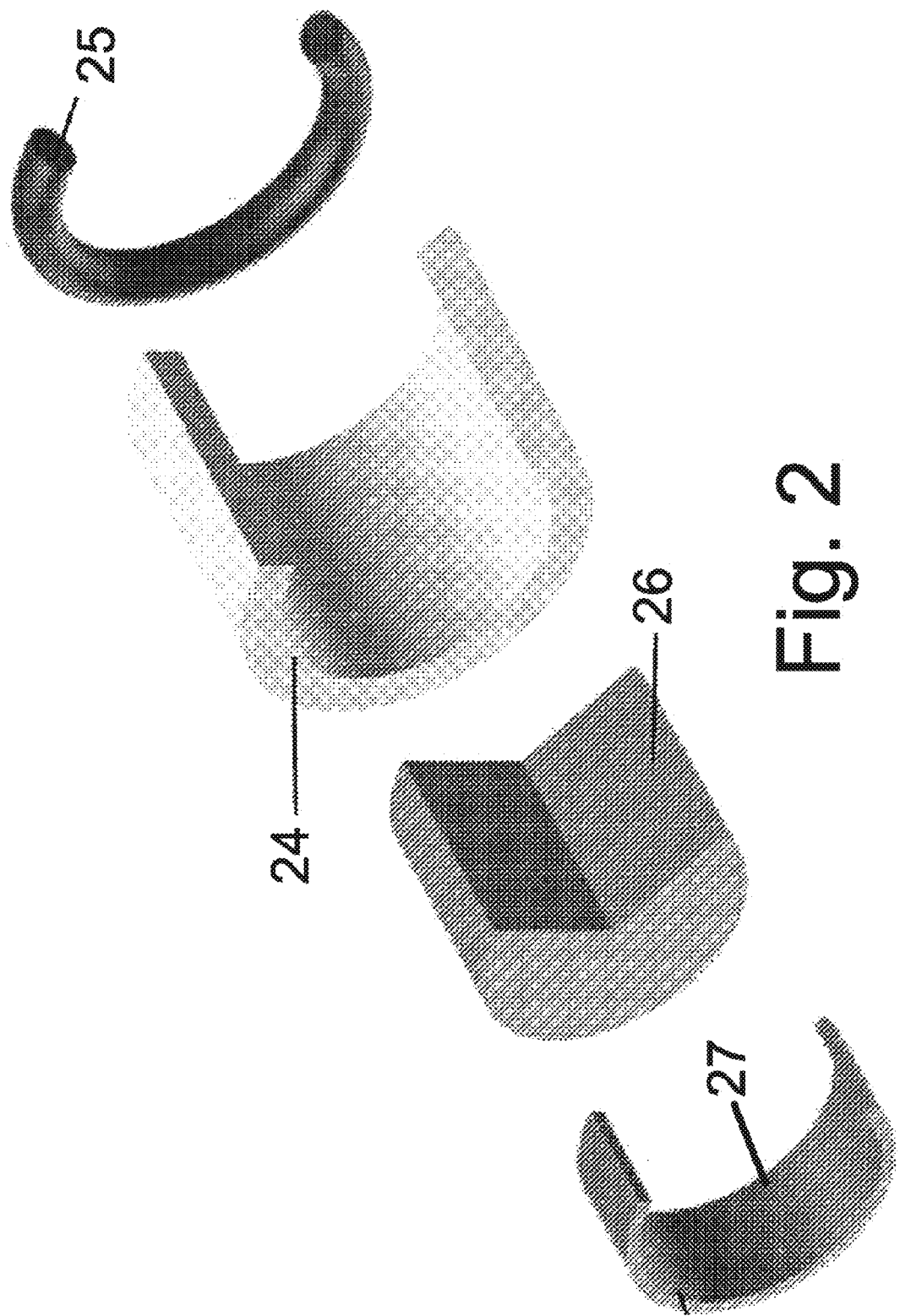

ROCKET APPARATUSES, SYSTEMS AND METHODS

FIELD

The presently-disclosed developments relate generally to rockets and rocket motors, and more specifically to implementations of thrust rings and the like therewith.

BACKGROUND

Numerous kinds and types of rocket systems have been developed, particularly for use by rocket hobbyists. Generally speaking, rocket systems particularly used with model or hobby rockets are typically either a build-it-yourself type or may employ a re-loadable kit. Some of these prior systems nevertheless still possess some disadvantages, including either complicated mechanisms or controlled substance issues, the controlled substances usually being the propellant grains and/or the consumable delay mechanisms which may in many instances be subject to control for safety. These are often referred to as pyrotechnic devices.

SUMMARY

Disclosed here is a thrust ring for a rocket motor for one or more of limited re-use or single use. In some implementations, the rocket motor may include: a rocket motor housing, the motor housing adapted to contain propellant; an aft closure with a nozzle, the aft closure connected or connectable to the housing; a forward closure connected or connectable to the housing; wherein one or both of the aft closure and the forward closure are connectable to the housing; and a thrust ring configured for connection to the motor housing using an adhesive. In some implementations, the connection may be in a manner adapted for one or both of limited re-use or single use.

These and still further aspects as shall hereinafter appear are readily fulfilled by the present inventions in a remarkably unexpected manner as will be readily discerned from the following detailed description of exemplary implementations hereof especially when read in conjunction with the accompanying drawings in which like parts bear like numerals throughout the several views.

DESCRIPTION OF THE DRAWINGS

In the drawings:

FIGS. 1f, 1g and 1h provide respective underside plan, cross-sectional and upper side plan views of a thrust ring for rocket motors according hereto;

FIGS. 1l, 1m and 1n are isometric views of rocket motors with thrust rings according hereto;

FIG. 2 is an exploded partially sectional view of a portion of a rocket, particularly of parts of an ejection delay assembly thereof;

DETAILED DESCRIPTION

Figure 1A:
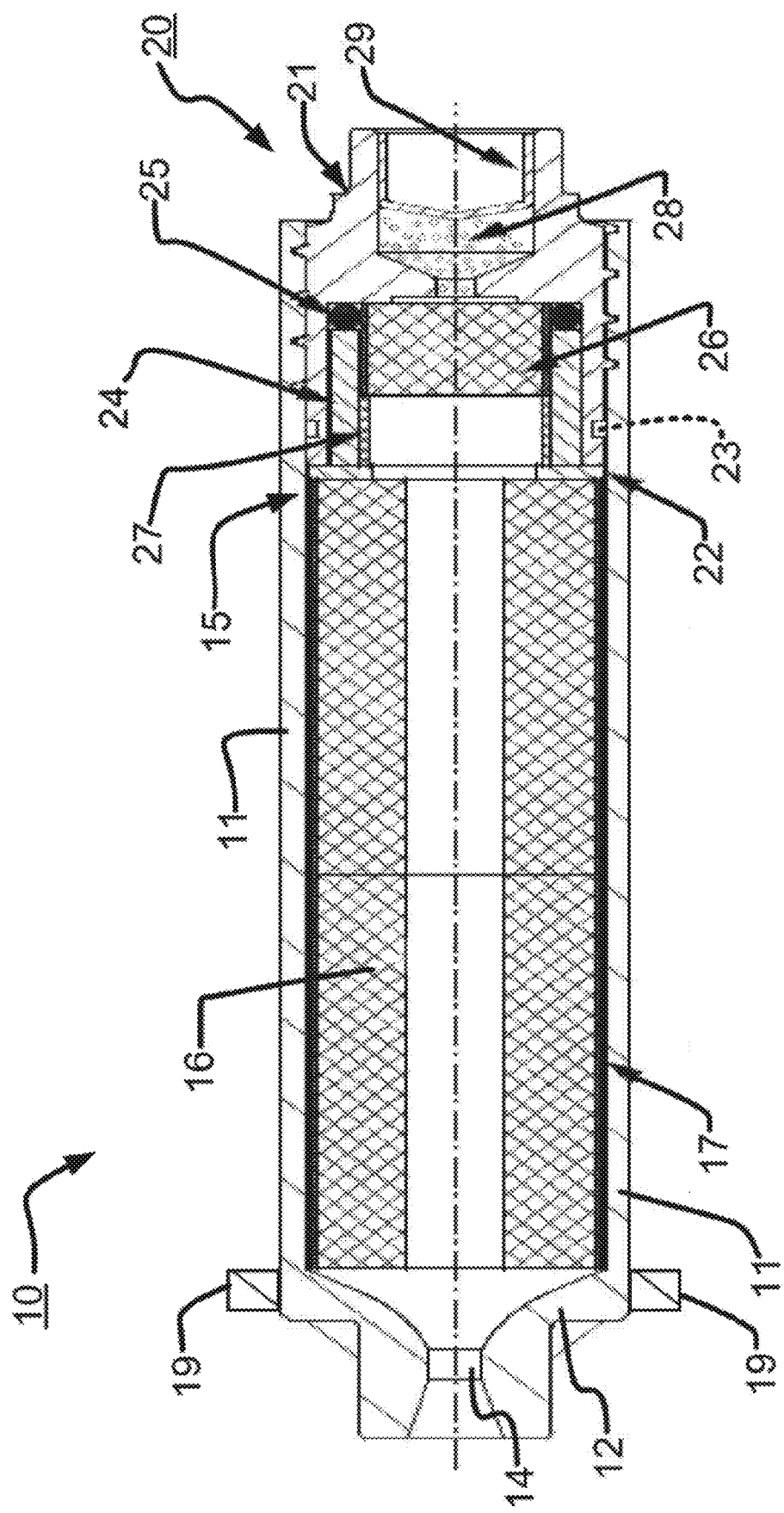
FIGS. 1a, 1b, 1c, 1d and 1e are cross-sectional views of rocket motors according hereto.

The current implementations of novel rocket systems generally include either single use or limited use systems. Generally, component parts and/or kits may be provided for loadable, typically single use rockets and/or for limited use rocket systems. In both these types of implementations, a rocket motor housing with an aft closure and a forward closure is provided. The aft closure includes a rocket nozzle. In many implementations, the housing and aft closure, with nozzle, may be preformed as or previously permanently or substantially permanently affixed together. In such cases, the rocket motor is made loadable by insertion by the end-user of the propellant and any delay and/or ejection charge or charges followed by or with the insertion of the forward closure. The forward closure may then be permanently affixed for a single use system, or removably loaded for limited re-use. In other implementations, the forward closure may be pre-affixed to the housing, pre-molded as such or permanently or substantially permanently connected, with loading of the housing through the aft opening closable by an aft closure member. In such case also, the aft closure may then be connected permanently or substantially permanently after loading for a single use, or made removably connectable for re-use.

The rocket motor casing is thus simply loadable and may be adapted for one or both of limited re-use or single use in that one of the aft closure and the forward closure are connected or connectable to the casing in a manner whereby one or the other is pre-affixed to the casing. Being pre-affixed, whether integrally formed with, or later attached thereto in a permanent or substantially permanent form, eases the loading of the motor for use, and in some cases, re-use.

For many implementations of single use motors, finding an acceptable solution for the thrust ring has been problematic; particularly for some sizes of single use motors. A thrust ring works by transferring the force of the rocket motor to the rocket body tube, and thereby preventing the motor from flying through the rocket—which is counterproductive to the purpose of the motor which is to supply propulsive thrust to the rocket vehicle. Other methods such as tightly-wound adhesive tape and glued-on paper or fiberglass rings have been used previously but they are very labor intensive and are highly dependent on the process used to install them. If the installation method or materials are not ideal, the rings can come loose under thrust, sometimes destroying the rocket, wasting the motor and/or very often creating a very dangerous safety hazard to spectators.

To use the herein-described developments relating to thrust rings, the nozzle is installed in the casing and epoxy is dispensed into the gap between the nozzle and the case until the level of epoxy rises to just below the end of the case. The thrust ring is then placed over the nozzle and pushed onto the end of the case until fully seated. The inner ring becomes embedded in the epoxy when cured, and the slight angle in the inner ring creates a physical restriction that prevents it from being ejected under pressure. As the thrust ring is pushed onto the case, the inner ring displaces some of the epoxy adhesive upward into the gap between the ring and the nozzle, increasing the length of the bond. Epoxy also flows into the gap between the inner ring and the case. This epoxy is allowed to cure before proceeding to the next (optional) step which is bonding the outer ring to the case with cyanoacrylate or similar low-viscosity adhesive.

Most of the inside length of the outer ring is in many implementations intended to be slightly larger than the case which allows the application of thin cyanoacrylate glue (CA) to wick into the gap, strengthening the adhesion of the ring to the case (this could be considered a redundant or back-up method of retention). Note: A small portion (, in many implementations, about 1/16") of the inside length of the outer ring is made in the same diameter as the case, which allows a snap or friction fit of the ring onto the last 1/16" or so of the case. This may be desirable in some implementations to secure the ring onto the case during assembly and prevent it from moving while the epoxy is curing. The herein-described developments can be injection molded or 3D printed. Applicant has already 3D printed according hereto. Materials can be PLA or ABS plastic for example, but virtually any plastic would work.

Figure 1B:
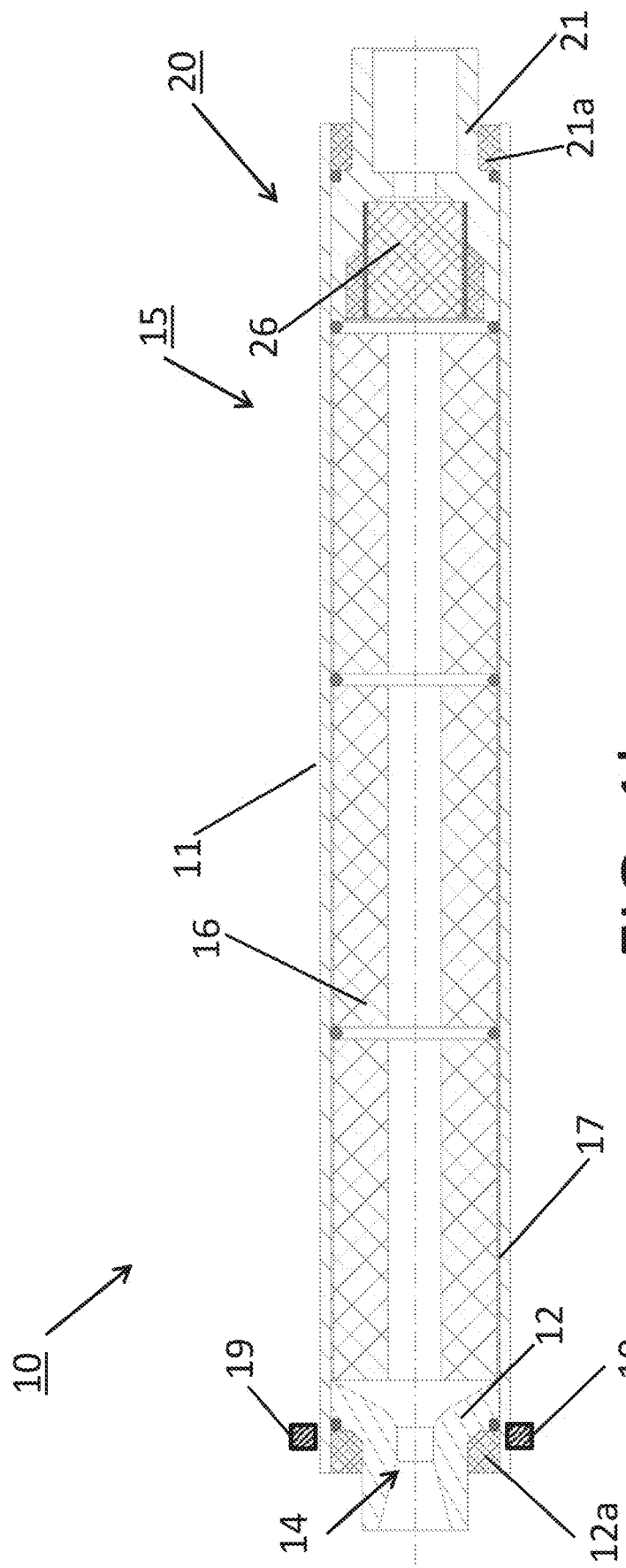
Figure 1C:
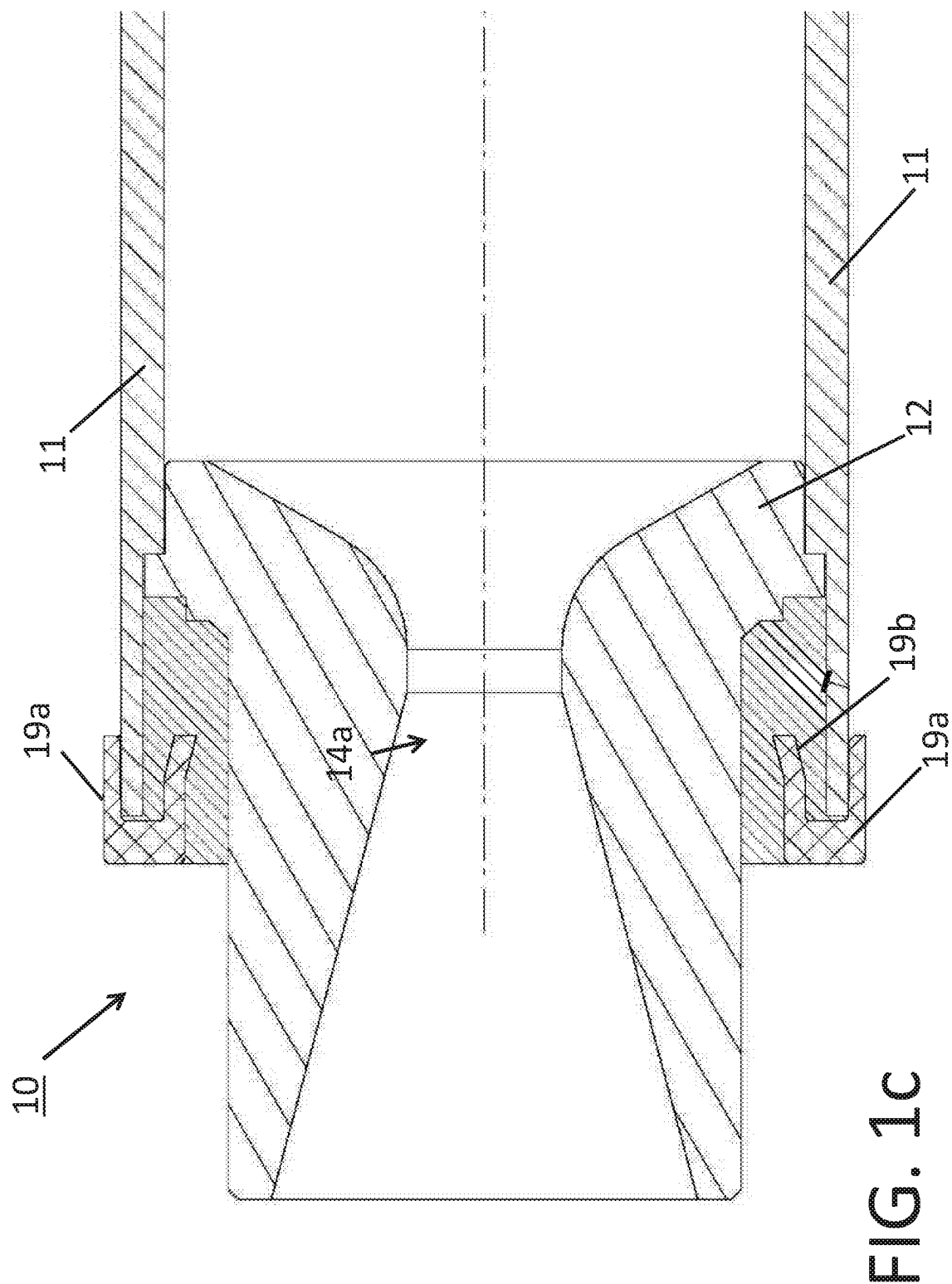
Figure 1D:
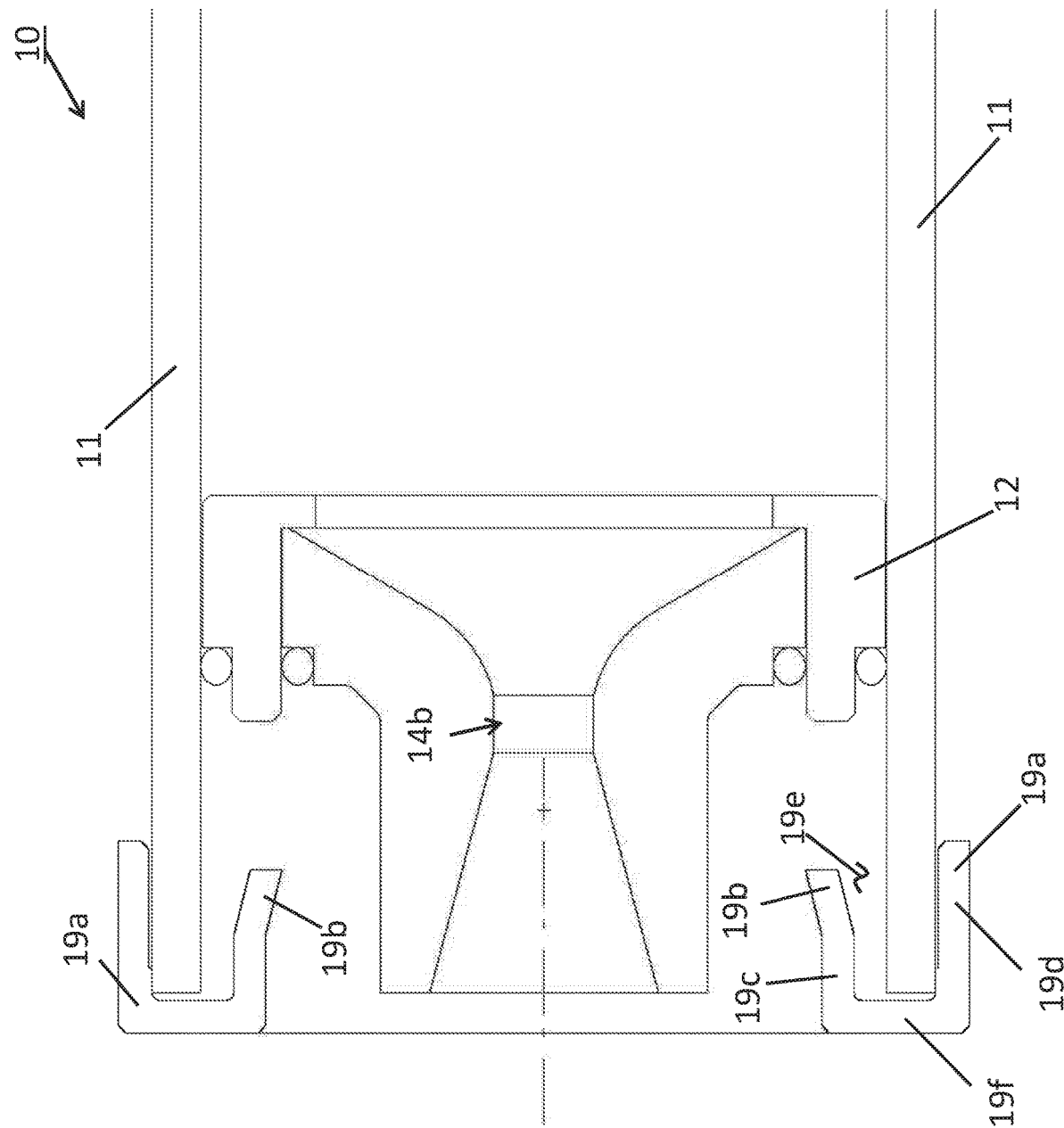
Figure 1E:
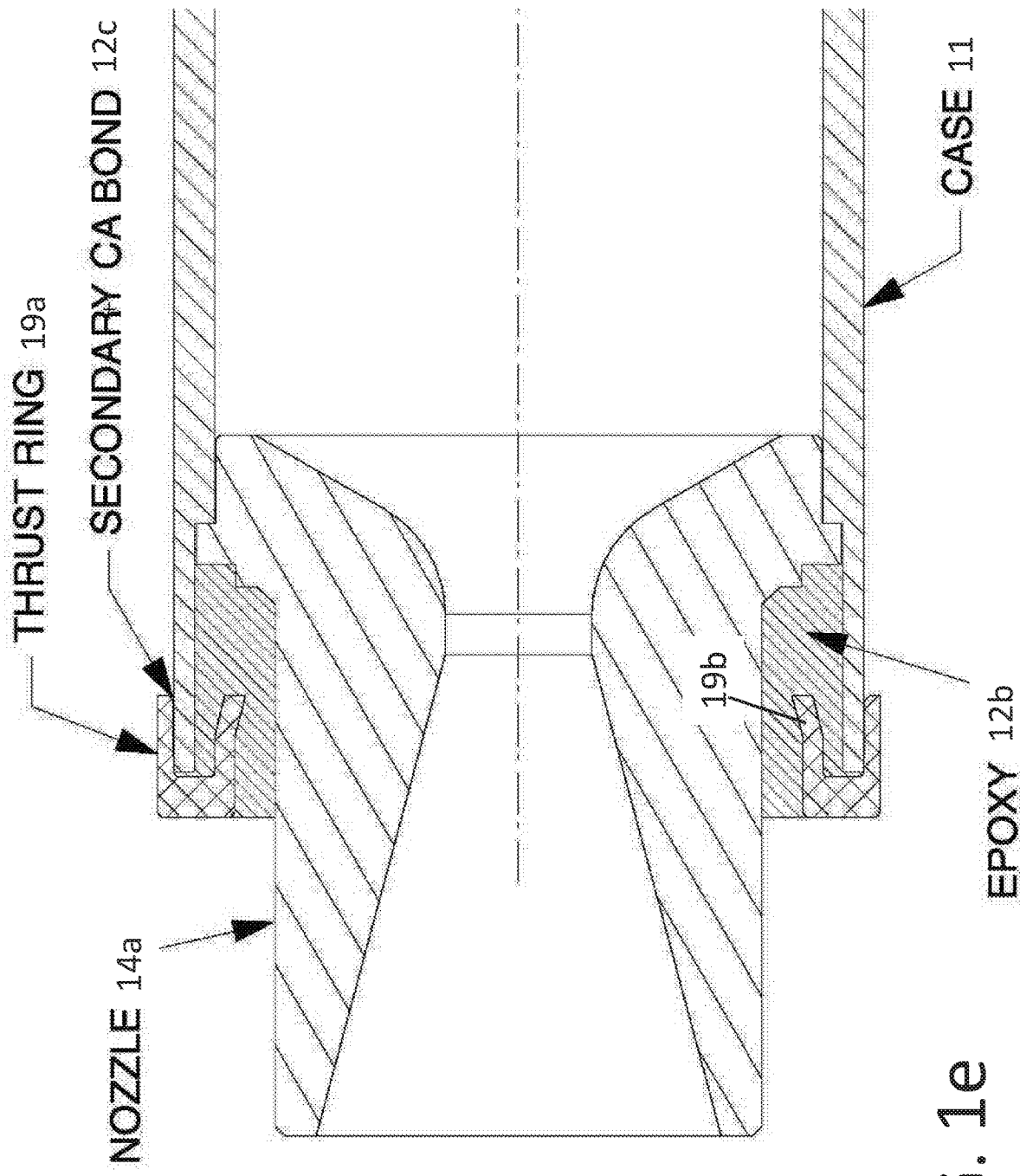
Figure 1I:
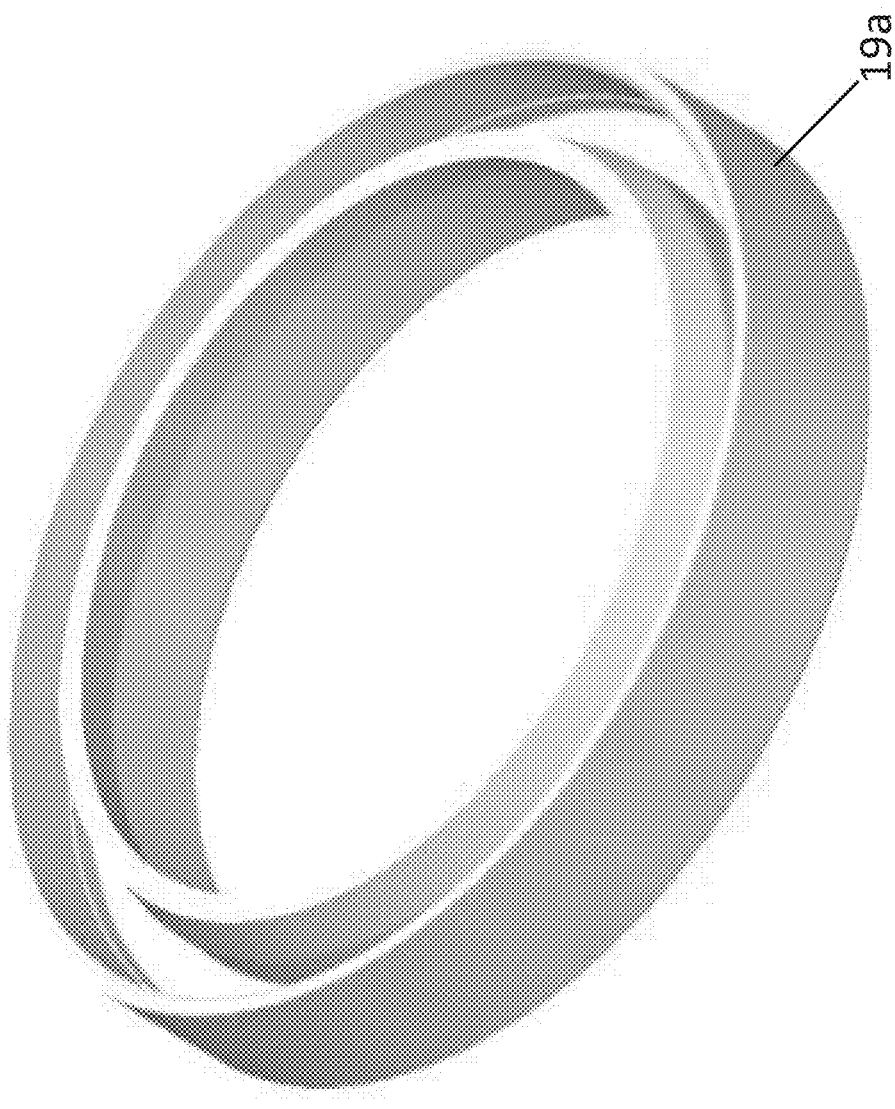
FIGS. 1i, 1j and 1k are isometric views of thrust rings for rocket motors according hereto.
Figure 1K:
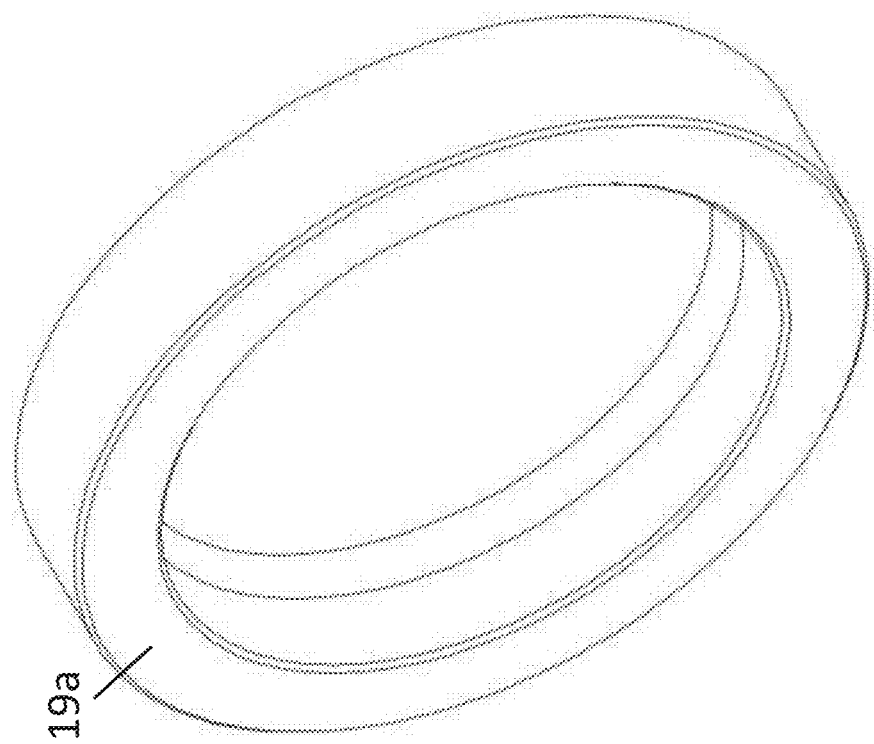
Figure 1J:
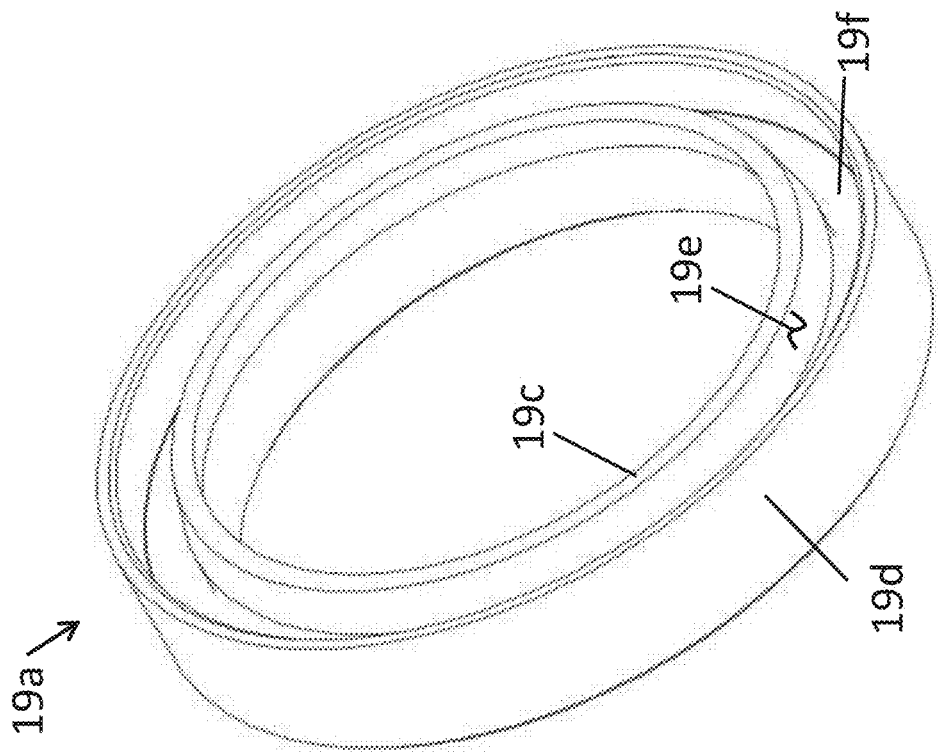
Figure 1I:
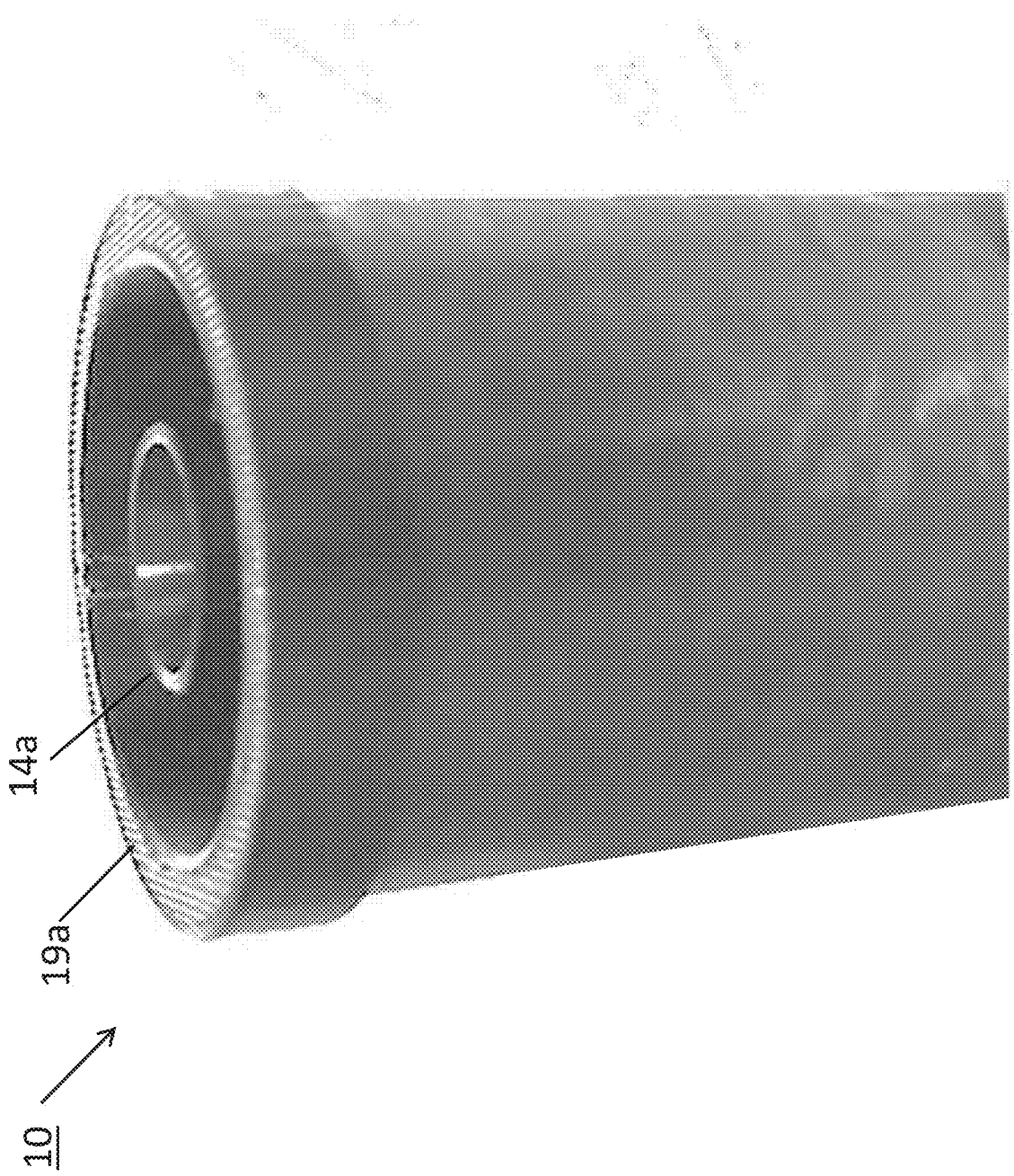
Figure 1M:
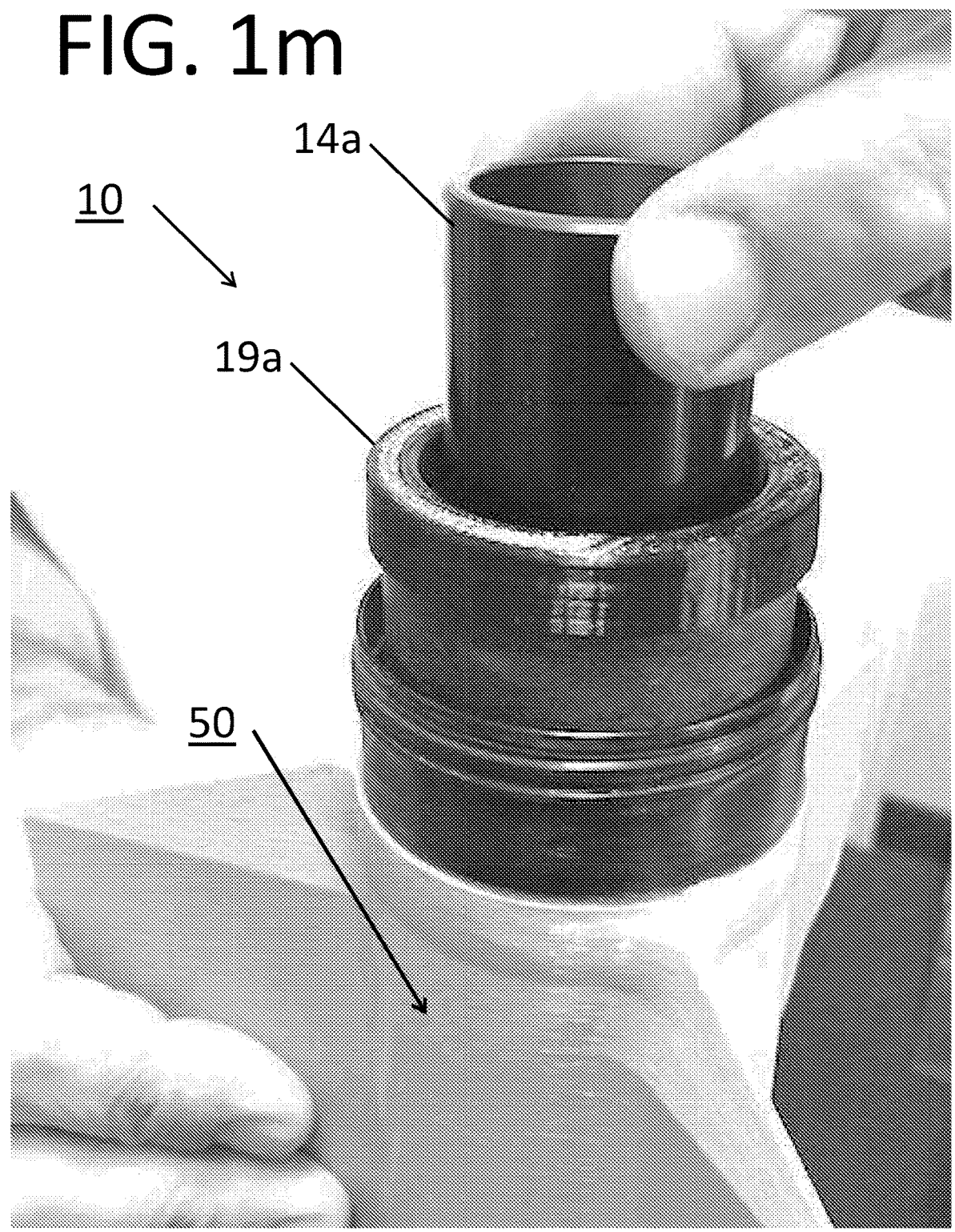
Figure 1N:
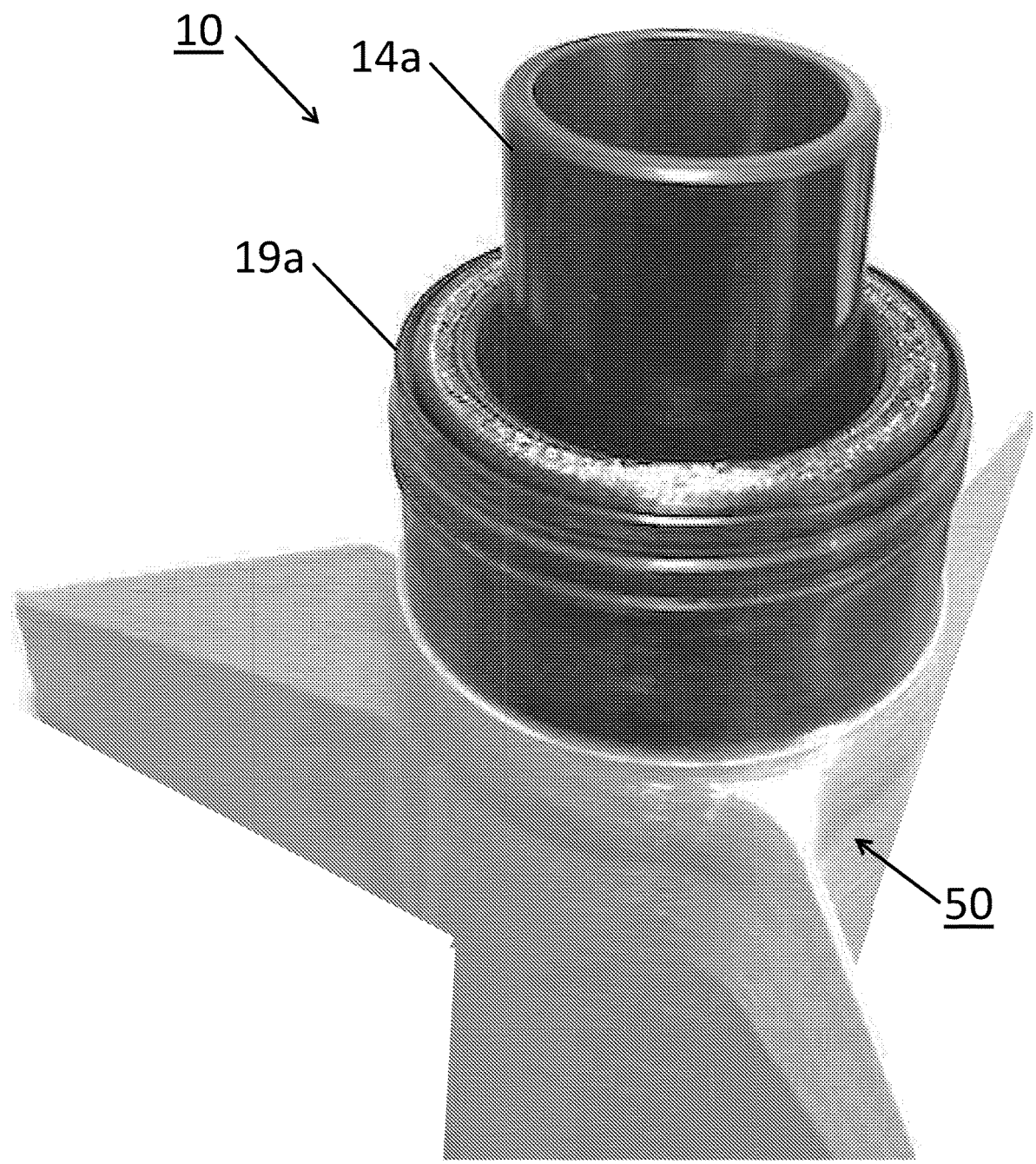

The attached drawings show thrust rings according hereto used in, at least initially, two different configurations; here, with relatively large and small nozzles (FIGS. 1c and 1d, respectively, large nozzle 14a in FIG. 1c and small nozzle 14b in FIG. 1d). FIG. 1e further indicates the adhesive material or potting compound 12b (denoted epoxy in FIG. 1e) that may be disposed to affix a thrust ring 19a to and/or adjacent the case 11 and the nozzle 14a. A secondary cyanoacrylate (CA) layer 12c is also indicated in FIG. 1e. FIGS. 1f, 1g and 1h provide some optional relative dimensions for a thrust ring hereof for hobby rocket use; and FIGS. 1i, 1j, and 1k show some alternative isometric views of a thrust ring 19a apart from a rocket motor. FIGS. 1l, 1m, and 1n show a motor 10 with a thrust ring 19a and nozzle 14a installed being placed into a rocket vehicle fitted with a threaded motor retainer. The screw on retainer cap is not shown (the un-shown cap is used to prevent the motor from being ejected from the rocket during activation of the parachute ejection charge).

The thrust ring 19a may be characterized as a centrally hollow disk or ring structure with an annular indentation or groove defining an inner wall and an outer wall, the annular indentation or groove being configured to receive the rocket motor housing or casing therein between the inner and outer walls. The annular indentation or groove is thus disposed between the inner and outer walls or what may alternatively be referred to as an inner and outer ring. The outer ring is designed to fit on the outside of the rocket case and the inner ring is designed to fit the space between the case and the nozzle. The inner ring or wall may in many implementations have a slight angle or angular portion 19b (see FIGS. 1c, 1d, 1e and 1g, e.g.) in the inner ring; this slight angle, when surrounded by and attached using the adhesive or potting compound 12b, ring may create a physical restriction that prevents it from being ejected under pressure. In one non-limiting exemplar, this may be an approximate 14 degree angular disposition, though many other angles and/or structures and/or methods may be used. Material for the ring could be stamped or machined metal, phenolic, fiberglass, fibre or other plastics and materials.

In the drawings, FIGS. 1d and 1j may be referred to to identify these structures. In particular, thrust ring 19a is shown having an inner wall 19c and an outer wall 19d with a hollowed portion 19e therebetween. A floor 19f of the U-shaped double ring is also shown, better in FIG. 1d, but also in 1j. Thus, the ring may also/alternatively be referred to as a "U-shaped hollow double ring", the hollow being the space 19e between the inner and outer rings; the outer ring fitting on/to the outside of the case and the inner ring fitting the space between the case and the nozzle.

Note, other devices, elements and/or methods could be used to retain the ring in epoxy such as holes, notches, a hook-like structure or a reverse taper or the like defined in the inner ring 19c. Or, the taper or other retention augmentation structure may not be used, just a straight inner ring embedded in the epoxy may be sufficient depending on the application.

In some primary but non-limiting implementations, following are more detailed views, with reference to the drawing figures, including assembly and operation instructions for either or both of a limited use or re-use system (also referred to as an LU system herein), and a single use system (also referred to as an SU system or MR system herein). First, described here is a sample listing of some parts which may be used in either or both of such types of systems. Referring to drawing FIGS. 1a, 1b and 2-9, a rocket motor apparatus 10 is shown having a casing 11, with a loadable (single use) or re-loadable (in limited re-use) kit 15. Some distinctions in some kits 15 may be identified where single use or re-use may be available, or desired. For example, in some re-use examples, multiples of the same parts may be sold for use with a single casing 11, in some examples three to one or other like proportions (e.g., three sets of propellant to one casing, etc.).

As shown in more detail for example in FIG. 1a, the casing 11 in this example has an aft closure 12 built-in, as in integrally formed therewith or affixed thereto permanently, or substantially permanently. A nozzle 14 is shown built-into the aft closure 12, and thus forms a part of the assembly of the casing 11. Note, the aft closure 12 and nozzle 14 may be formed as a part of the casing 11 as during a molding operation, where the elements are formed together simultaneously, or, either or both the aft closure 12 and/or the nozzle 14 may be affixed to the casing 11 after formation thereof, as by welding or bonding or otherwise attaching one to the other. Further note that although the aft closure 12 is shown pre-affixed to the casing 11 in the drawing example of FIG. 1a, and FIGS. 2-9 herein, however, it may be that the forward closure element 21 (see description thereof below) is pre-affixed to the casing 11, with the aft closure 12 to be connected to the casing after loading of the interior elements. FIG. 1b shows an alternative with the aft closure 12 mounted to the casing by epoxy or like potting material or adhesive 12a.

Figure 3:
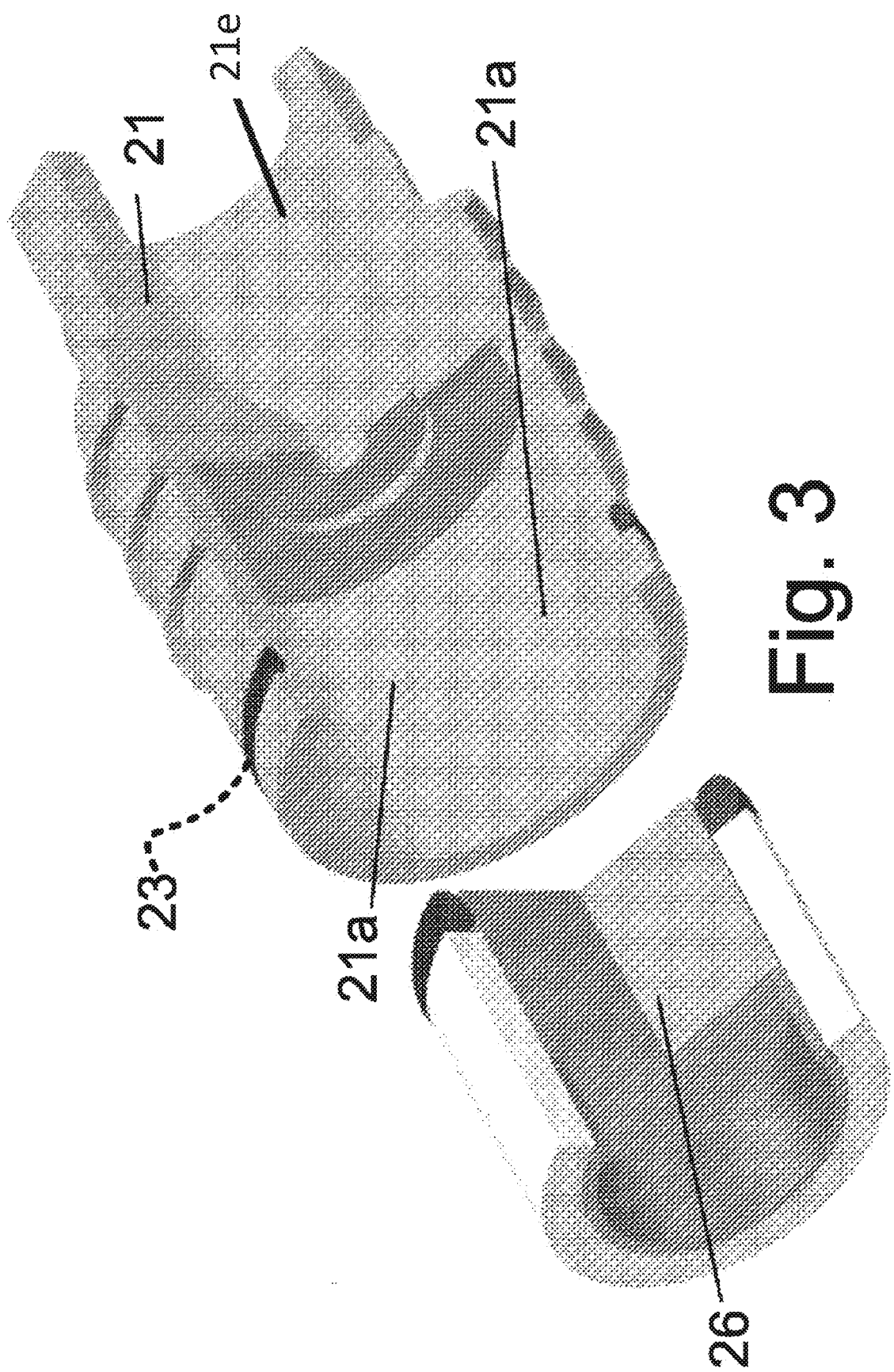
FIG. 3 is an exploded, partially sectional view of a forward closure assembly with an ejection delay assembly which may be used therewith.
Figure 7:
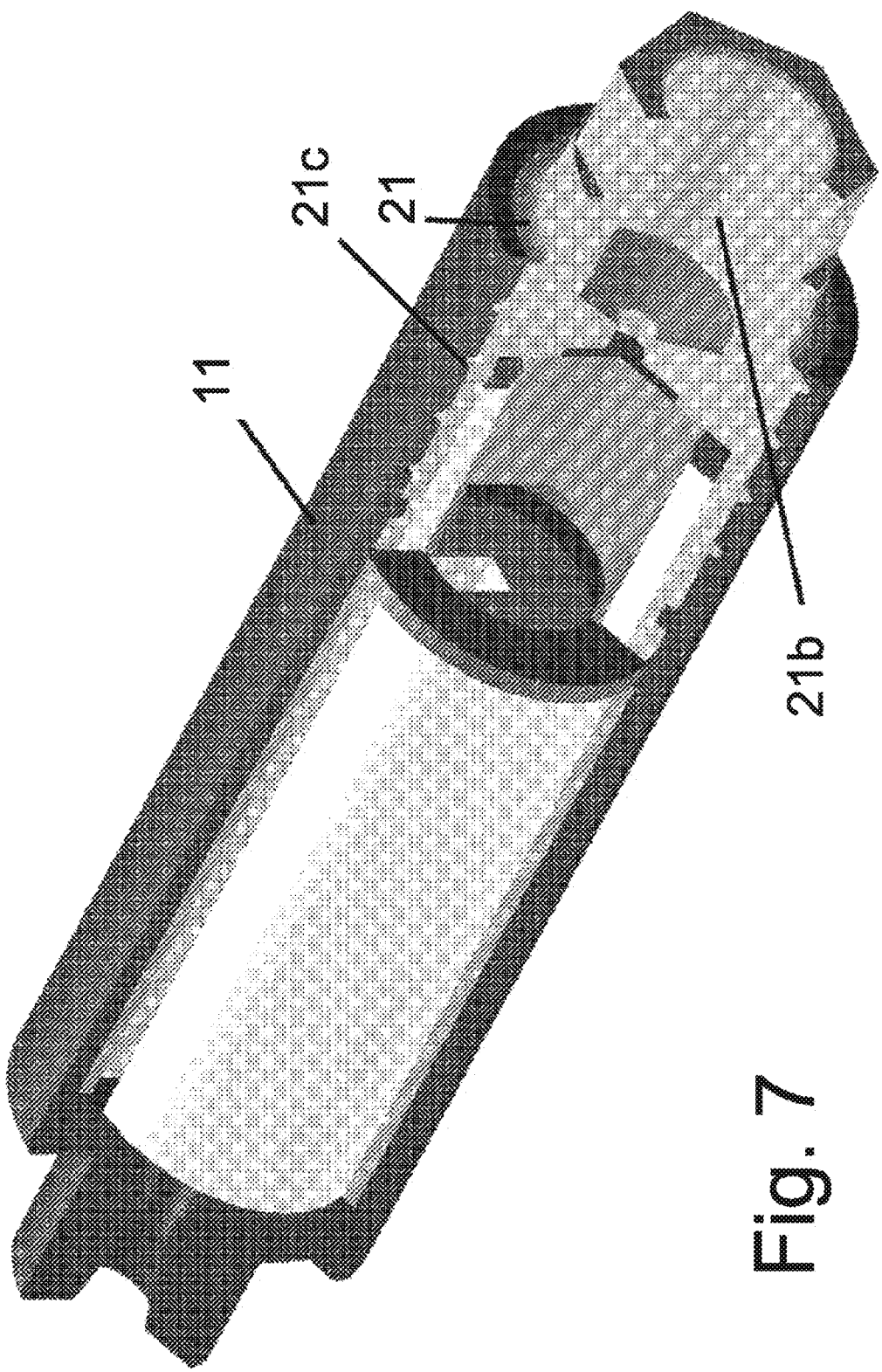
FIG. 7 is a partially sectional isometric view of a rocket motor hereof including a rocket motor casing with a propellant grain and a forward closure assembly with an ejection delay assembly disposed therein.
Figure 8:
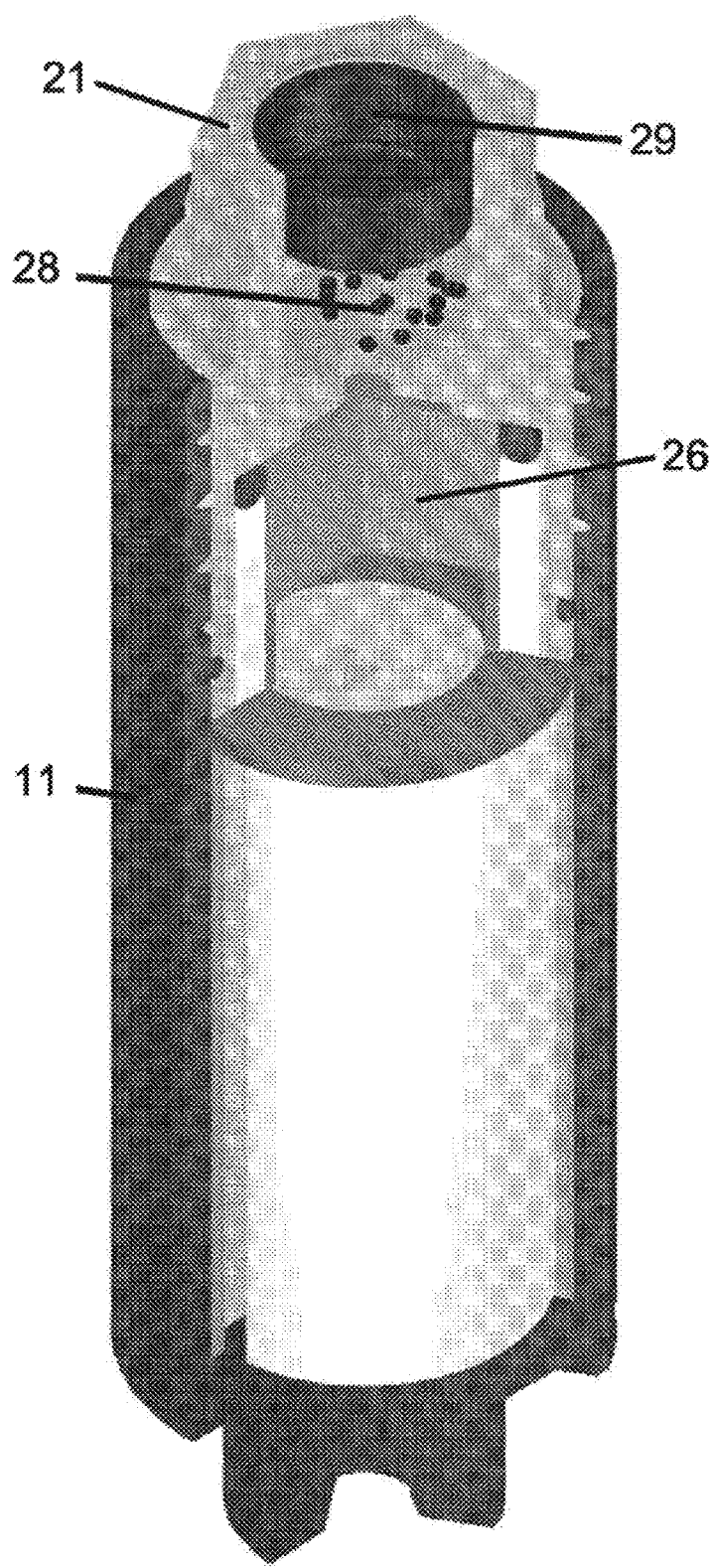
FIG. 8 is a partially sectional isometric view of a rocket motor like that of FIG. 7 with an ejection charge included and an ejection charge cap in place.

Continuing with a description of some exemplar elements in FIGS. 1a and 1b, a load/reload kit 15 may include a propellant grain 16 with a liner (often a long paper tube) 17, and a forward closure assembly 20, which may include a forward closure element 21 (sometimes also/alternatively referred to as a bulkhead), a forward insulator 22 (typically a black fiber washer) between the propellant and the fore closure, a forward closure o-ring 23 (shown with a leader line in dashed line form in FIG. 1a (and also FIG. 3, below) as this may be a typical option for re-use, but likely not typically used for single-use as an epoxy or other permanent seal may be used instead, see FIGS. 3 and 7, below), a delay insulator 24, a delay o-ring 25, a delay element 26, a delay spacer 27, an ejection charge 28 with ejection charge retainer cap 29 (often a rubber cap) (typically, the ejection charge may be contained within a discrete storage/transport container (not shown).

Also shown in FIGS. 1a and 1b is a schematic representation of a prior aft thrust ring 19 which may be pre-connected to (as in integral with or later affixed to) or later connected to a casing 11. Aft thrust ring 19 may interact with a rocket body (50 in FIGS. 1m and 1n) to carry the rocket body. Ring 19 may be affixed before or after the insertion of the loadable/re-loadable kit elements. Also not shown in FIG. 1a, 1b is an igniter 30 (see FIG. 9, which may be a Copperhead™ igniter available from RCS Rocket Motor Components, Cedar City Utah), and an igniter holder 32 (often a rubber band or similar in hobby rocketry). Further elements not shown include an optional motor spacer (short tube) which may be used in the rocket compartment to space the rocket motor relative to one or more rocket payloads, and a packet of Super Lube™ lubricant (Synco™ brand, Synco Chemical Corporation, Bohemia, N.Y.) or other grease, and any adhesive and/or labels or labeling (described below are optional uses of cyanoacrylate adhesive and epoxy (e.g., a 5 minute epoxy) and a self-adhesive motor identification label).

Figure 10:
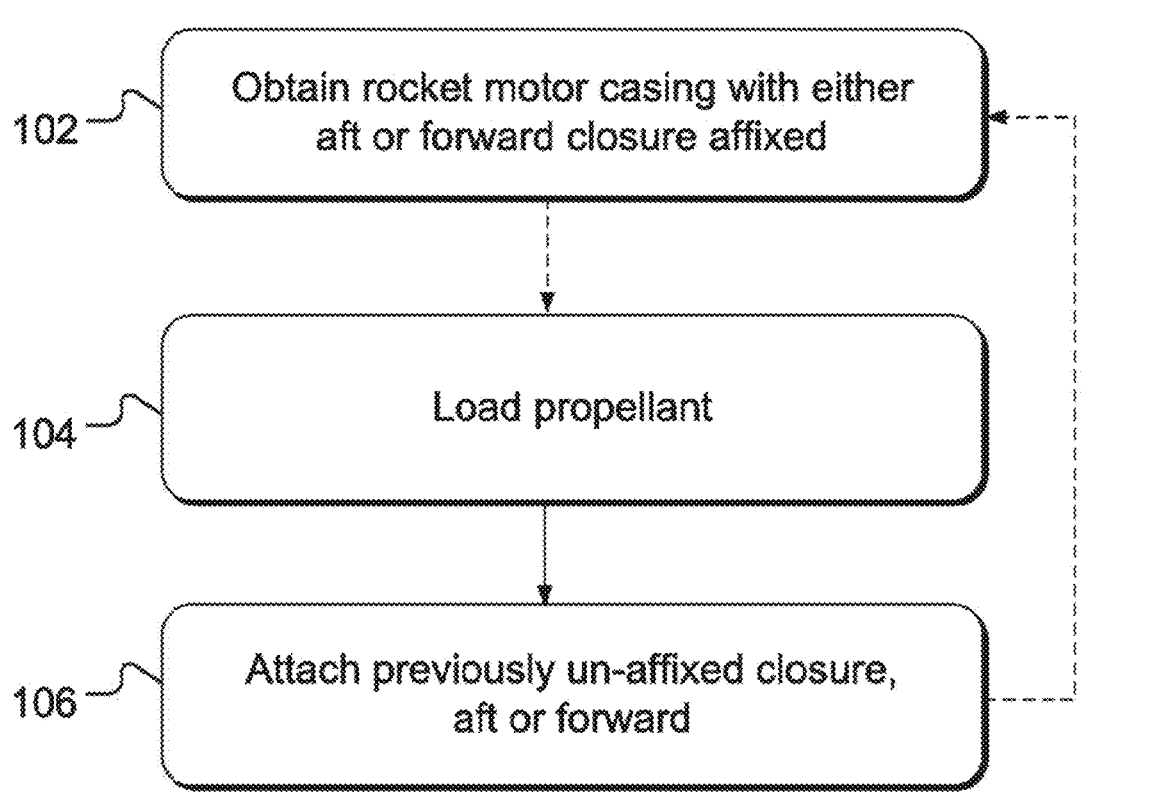
FIG. 10 provides a flow chart of a use according hereto.

In use, particularly first in assembly, a few operations generally may be summarized as shown for example in FIG. 10. One implementation of an assembly method 100 may include first obtaining or otherwise starting with a rocket motor casing with either an aft or forward closure affixed thereto. This is indicated as operation 102 in FIG. 10. Often, the pre-affixation may be at a manufacturer location, though it need not be. Then, an operation 104 may include loading the propellant into the casing. (A dashed line arrow between operations 102 and 104 indicates that these steps may be pre-performed, as at a manufacturer factory, and may not necessarily occur in the order shown.) Note further that the pre-formation and/or packaging of rocket motor elements can include establishing a pre-determined amount of propellant which might aid packaging for transportation in commerce under federal regulations (e.g. DOT or BATFE regulations). A follow-on operation 106 may then include attaching a previously un-affixed closure, either the aft or forward closure, whichever was not priorly affixed to the casing. The rocket may then be ready to fly. Note, additional operations may occur as well, as for example, if an ejection delay is desired, wherein it would be loaded into the casing as well prior to final assembly of the rocket. Note also that a dashed line is shown connecting operation 106 back to operation 102, this signifying the option of re-use in some circumstances as described herein.

Figure 4:
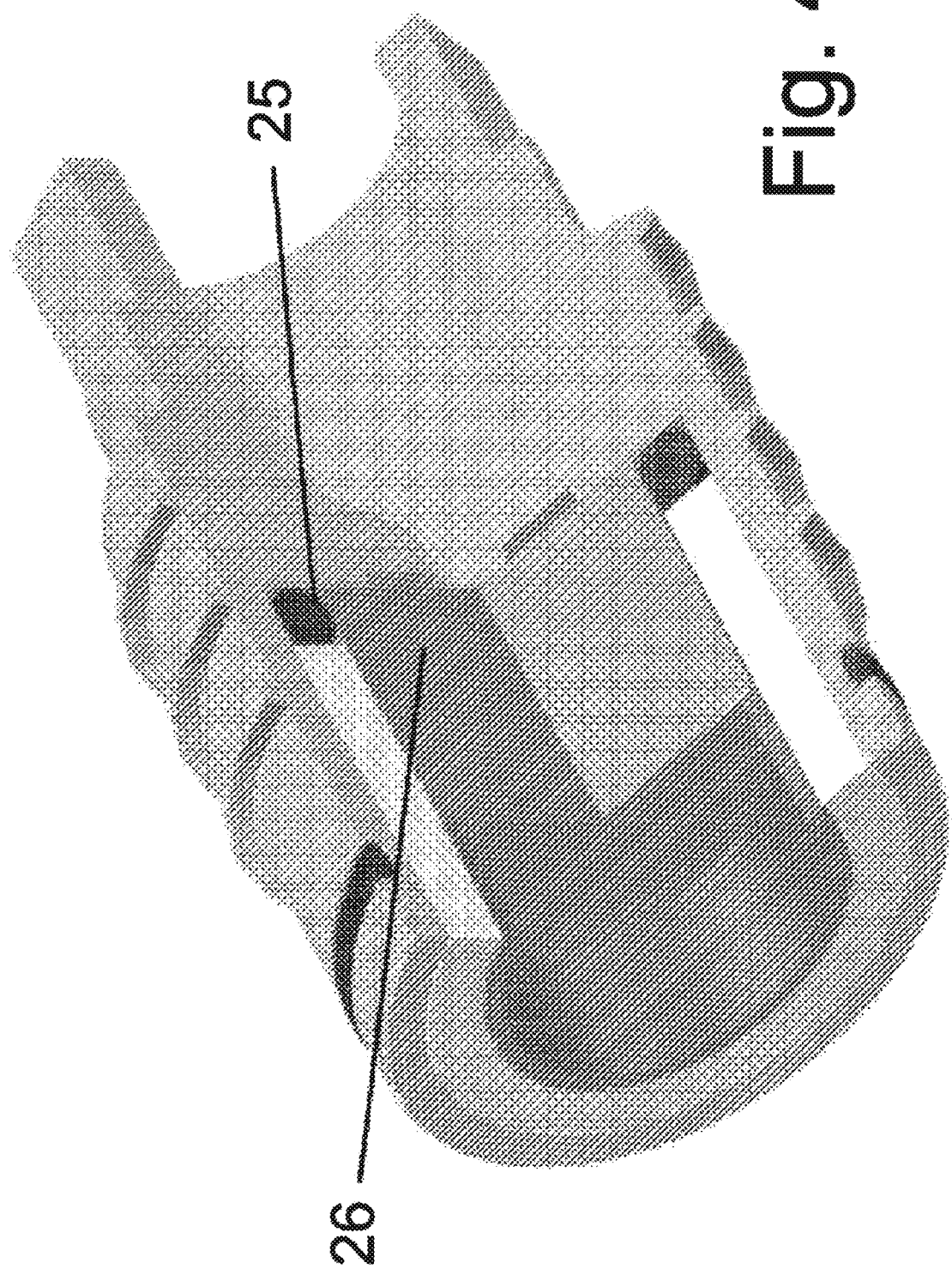
FIG. 4 is an isometric, partially cut-away view of a forward closure assembly with an ejection delay assembly disposed therein.

A more detailed assembly operation is described in the following, particularly with reference to FIGS. 2-9. A first set of such assembly operations, as for example in the assembly of a forward closure which is not pre-affixed to a casing, may include the following. A light coat of an acceptable rocket motor grease (such as a Synco™ Super Lube™ lubricant as introduced above) or other grease may be applied to any o-rings, particularly to the delay o-ring 25, and to the forward closure o-ring 23, if used. FIG. 2 shows an assembly of a delay system, e.g., of a delay element 26 within an insulator 24 with a spacer 27 and an o-ring 25. It may be advantageous if both inner edges of the delay insulator 24 are chamfered (in hobby rocketry and with appropriate materials, here e.g., paper; this may be accomplished easily with a hobby knife or even with a fingernail). The delay element 26 (e.g., an RMS-Plus™ delay element, available from RCS, Cedar City Utah), delay insulator 24, delay spacer 27 and delay o-ring 25 may then be assembled as shown, particularly in moving from the exploded view of FIG. 2 to the assembled view of FIG. 3. Again, if re-use is contemplated, then, as shown in FIG. 3, a forward closure o-ring 23 would be installed into the groove in the forward closure 21. A light film of grease may be applied to the inner circumference, of the delay cavity 21a (but not within the forward end cavity of the closure element 21 which is also the ejection charge cavity 21b, described further below). Then as indicated in FIG. 4, the delay charge assembly (of FIG. 3) may be inserted into the delay cavity 21a, delay o-ring 25 end first, until it is seated against the forward end of the forward closure 21. Note, it may be that the delay elements (24, 25, 26 and/or 27) of FIGS. 2 and 3 are not pre-assembled, but rather one or more at a time inserted within the cavity 21a in appropriate order. In either case, the resulting disposition shown in FIG. 4 should be achieved.

Figure 5:
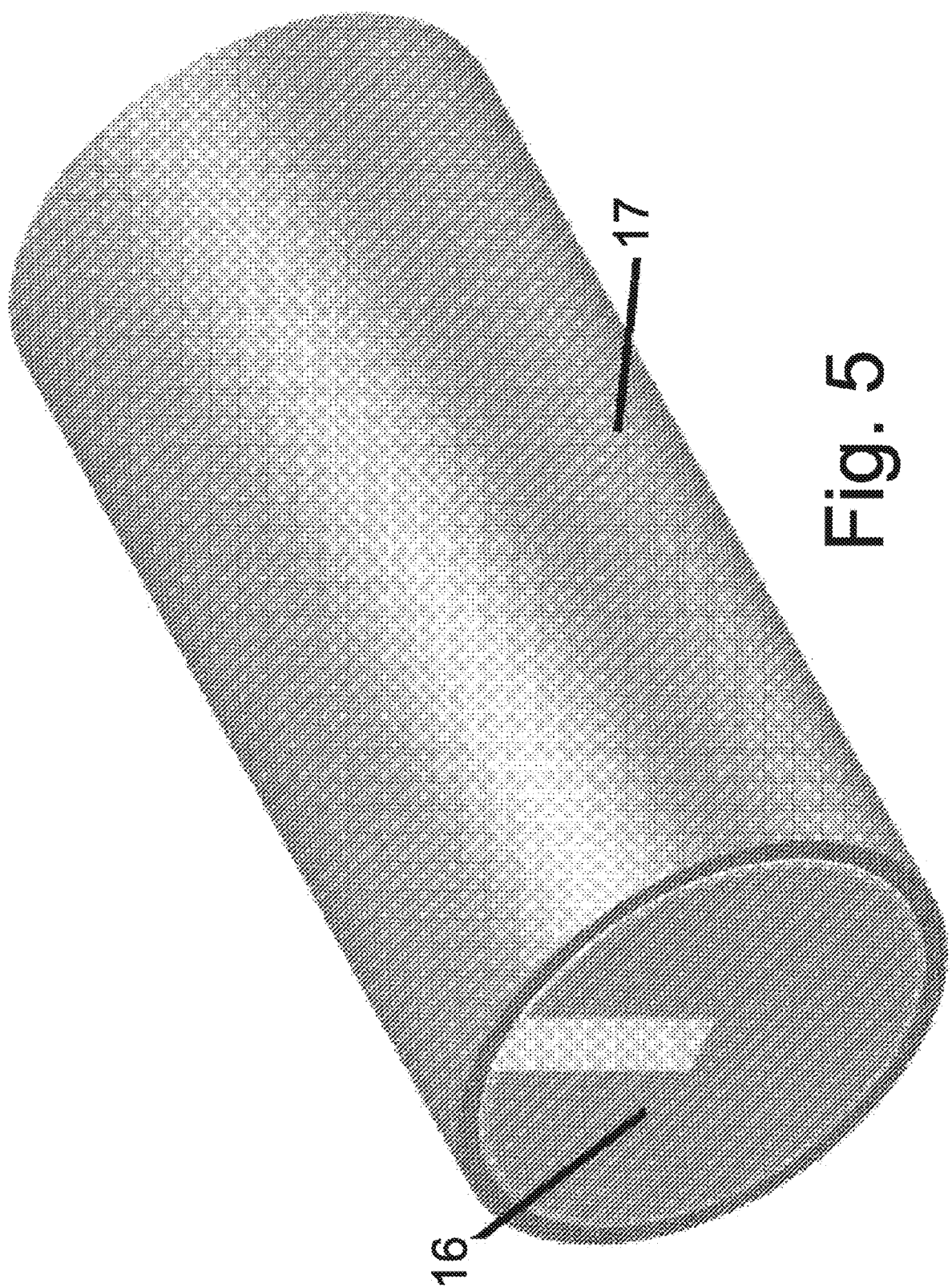
FIG. 5 is an isometric view of a propellant grain assembly hereof.
Figure 6:
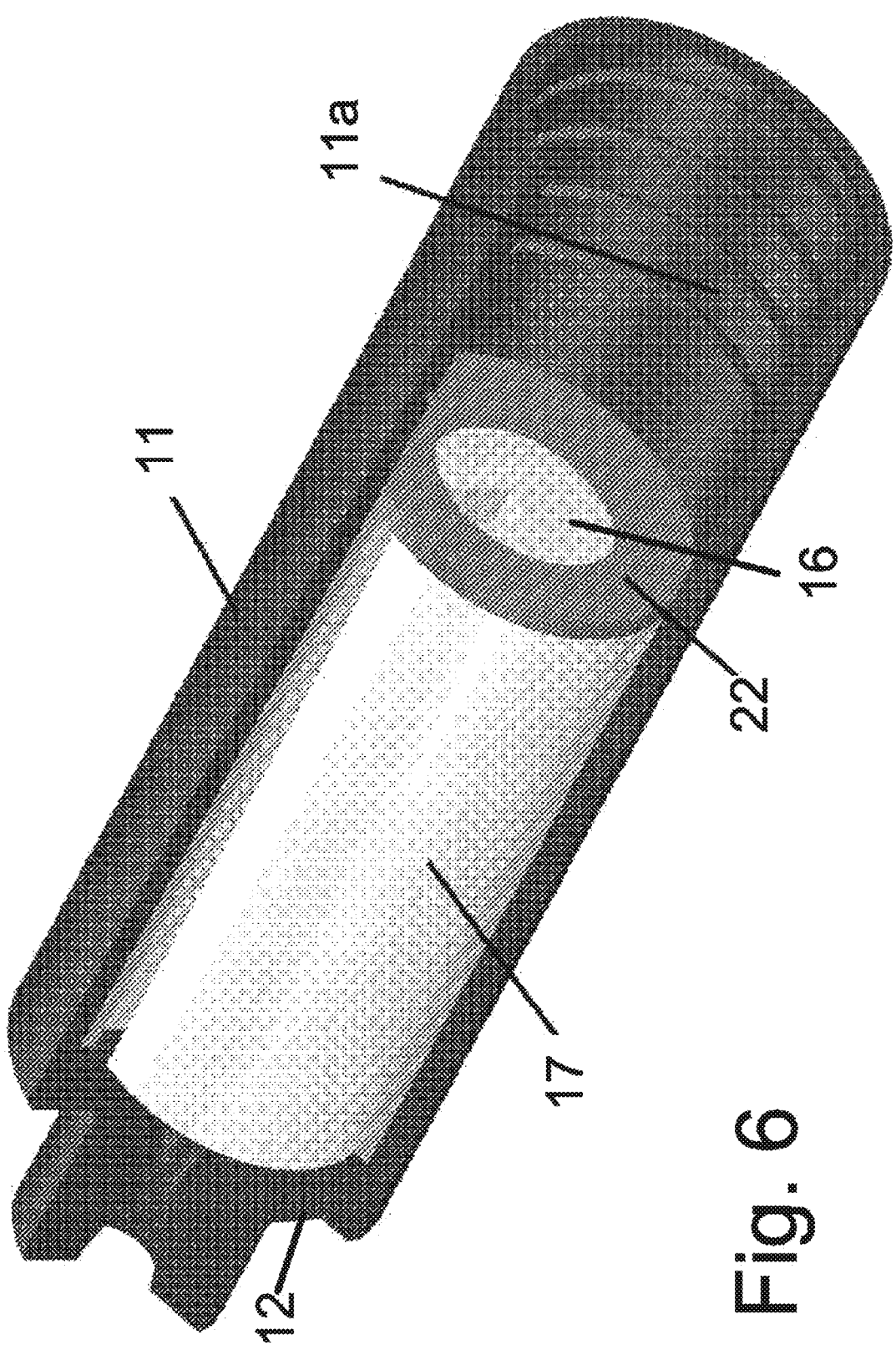
FIG. 6 is a partially sectional isometric view of a rocket motor casing with a propellant grain.

Then, in a second set of operations, case assembly may further include the following. As shown in FIG. 5, the propellant grain 16 may be installed into the liner 17 (before or after the liner 17 is inserted in the motor casing 11). As shown in FIG. 6, the liner assembly, propellant 16 and liner 17 is disposed/inserted in the motor casing 11 until it is seated against the nozzle end of the case, e.g., at aft closure 12. Note if re-use may occur, a light coat of grease on the outside surface of the liner 17 will facilitate removal of the liner 17 from the casing 11 and facilitate cleanup of the casing 11 after motor firing for re-use of the casing 11. Also shown in FIG. 6 is the forward insulator 22 (here, a black fiber washer) installed into the motor casing 11 until it is seated against the liner/propellant combination. A forward cavity 11a of casing 11 is then left for the forward closure element 21.

Then, as shown in FIG. 7, the forward closure element 21 is inserted in the casing 11. In general, but, particularly if re-use is an option, a light coat of grease may be pre-applied to the inside surface of forward cavity 11a of the casing above the liner/propellant combination before insertion of closure 21. However, if a single use is contemplated, grease may rather be substituted by an adhesive such as an epoxy or cyanoacrylate. In one example for hobby rocketry, about 5 grams of a 5-minute epoxy may be mixed and then applied as a light coat of epoxy to the inside surface of the casing cavity 11a in the area above the liner assembly. Note, this may be a threaded area 21c as well for ease of insertion and locking of the forward closure assembly therein whether in single use or re-usable form. Then, with the motor casing 11 held in some preferable implementations, in a substantially horizontal position, the previously assembled forward closure assembly 20 may then be threaded into the open end 11a of the motor casing 11 by hand until it is seated against the forward insulator 22. Note, if using a re-use o-ring 23, care should be used to avoid pinching the forward closure o-ring 23 in the threads at 21c of the casing 11 during installation, so that there is no burn through, and so that the casing and forward closure won't be damaged so that either or both may then be re-used. Alternatively, if in single use form, then, additional epoxy may be applied during and after insertion of closure assembly 20 in the casing 11, particularly to the fore joint between the forward closure 21 and the case 11. The completed assembly may then be temporarily set aside in a vertical position for insertion of the ejection charge as described below. Also, if epoxy has been used, some time to cure may be desirable, and a vertical positioning may be desirable for uniformity of curing. Note such a single use motor may be fired as soon as the bulkhead epoxy has solidified.

Then, in a third set of operations, particularly if an ejection charge is to be used, the ejection charge installation may include the following. An ejection charge is obtained, usually a black powder charge which may come in a special container therefor (e.g., a two-piece plastic cap). The ejection charge 28 (see FIG. 8) is then dispensed into the ejection charge well 21$b$ (see FIG. 7) of the forward closure bulkhead 21. The ejection charge cap 29 (typically, a red rubber cap) may then be pressed into the ejection charge well (see FIGS. 1 and 8). Any air trapped under the cap 29 may be released by puncturing the cap 29 (typically at the center thereof) using the sharp point of a hobby knife. With the motor held in a nozzle down position, the motor 10 may be gently shaken to settle the ejection charge 28 into the cavity above the delay element 26. A self-adhesive label or other indicia device or marking (not shown) may optionally be applied to the case 11 to identify motor type and delay time.

An aft trust ring 19 (see FIG. 1$a$, 1$b$) or 19$a$ (see FIGS. 1$c$, 1$d$, 1$e$, 1$f$, 1$g$, 1$h$, 1$i$, 1$j$ and 1$k$) may be bonded to the nozzle end of the case 11, e.g., at aft closure 12. Such may be bonded with cyanoacrylate (CA) adhesive (in FIG. 1$a$), or otherwise affixed to the casing 11, and, this may be pre-affixed (as in molded therewith) or later affixed as suggested here. Or, as shown in FIGS. 1$c$-1$k$, the thrust ring 19$a$ may be affixed with potting compound or adhesive such as epoxy. See particularly FIG. 1$e$ where the epoxy 12$b$ is shown connecting the housing 11, the aft closure 12, the nozzle 12$a$ and the thrust ring 19$a$ together. The connecting material 12$b$ may be solid-setting adhesive or potting compound materials, often initially in liquid or semi-solid form before setting. More frequently 12$b$ may be polymeric potting compositions, and/or epoxies, polyesters, polyurethanes, phenolics, cyanoacrylates (though cyanoacrylates are most often used as an adhesive more than as a potting compound), and similar or like polymeric potting compositions. The secondary bond 12$c$ may more frequently be cyanoacrylate or like bonding material. The thrust ring may be color coded or otherwise identified for particular usage relative to size of motor, rocket, or the like. Thus, alternative rings, by size, shape or otherwise may be provided.

Figure 9:
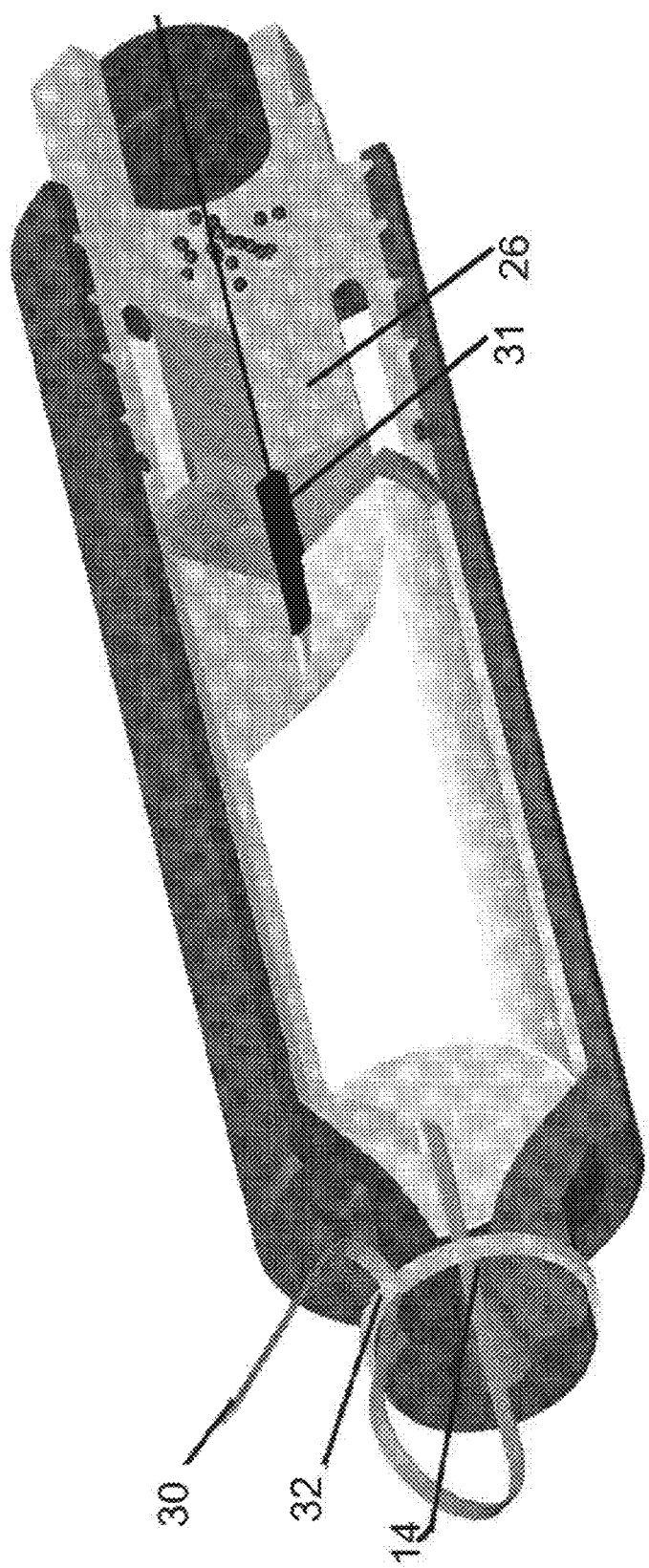
FIG. 9 is a partially sectional isometric view of a rocket motor like that of FIG. 8 with an igniter installed.

Then, in a fourth set of assembly operations, preparation for flight may further include the following. As shown in FIG. 9, the coated end 31 of an igniter 30 (e.g., a Copperhead™ igniter from RCS) may be inserted through the nozzle throat 14 until it stops against the delay element 26. The aft exposed end of the igniter 30 may be bent into an 'S' shape as shown. The rubberband igniter holder 32 (or other holder, e.g., tape, glue or the like, particularly if in single-use form) may be placed over the nozzle extension 14 to secure the igniter 30 to the motor 10. The motor 10 may optionally be marked or labeled to indicate the delay time installed in the motor (if re-used, a new mark or label should be used every time the casing is re-used). The motor may then be installed into the rocket's motor mount tube (not shown). The motor 10 should be securely retained in the rocket (not shown) by using positive mechanical structure to prevent it from being ejected at the time of ejection charge firing. Note, to safely use motors such as those described here to launch hobby rockets (such as an AeroTech® rocket kit, from RCS), the installation of appropriate (typically two) spacer tubes in front of the motor may be appropriate to space the motor within the rocket, as for example, relative to any payload.

Such one or more spacer tubes may be packaged with a reload kit 15 hereof and/or may be separately available, and/or may be available with the rocket itself (e.g., an AeroTech® rocket kit). Such one or more spacer tubes may then be slipped into the rocket's motor mount tube, ahead of the motor 10. In many examples, the motor clip may then snap into one or more slots in the nozzle end of the motor casing and this may ensure that the motor clip firmly locks the motor into place within the rocket.

For many hobbyists, it may be preferable to prepare the rocket's recovery system and then launch the rocket in accordance with the National Association of Rocketry (NAR) Safety Code and National Fire Protection Association (NFPA) Code 1122. NOTE: It may also be strongly recommended that the user use the AeroTech Interlock™ igniter clip with Copperhead™ igniters. A high ignition reliability may be achieved with an Interlock™ clip used in conjunction with a properly-installed Copperhead™ igniter and a fully-charged 12-volt car battery. The rocket motor 10 may then be ignited and the rocket may then be flown.

A fifth set of operations may involve post-recovery clean-up, in many instances including one or more of the following. After the motor has cooled down, the forward closure and may be removed and in many implementations may be disposable and discarded. The forward insulator and liner may then be removed from the casing and discarded. Typically using a wet wipe or damp paper towel, the inside of the casing may be cleaned to remove all propellant combustion residues. A light coat of grease may be applied to the inside of the motor casing for storage, if desired, which may preferably be in a dry place. A single use motor would not typically require detailed clean-up by rather alternatively being discarded.

Note for multiple use motors, the entire motor should be discarded when the casing has been used the maximum number of times specified by the manufacturer. Otherwise, motor clean-up should be performed as soon as possible after motor firing. Propellant and delay residues may become difficult to remove after long periods. Note further for single use motors that the entire motor should be discarded when the casing has been used a single time as specified. The spent motor components should be disposed of properly. In a her operation involving disposal, damaged or defective reload kits should not be used, but rather should be returned to the manufacturer, or other safety depot.

Note, commercially available elements or parts of the above-described assemblies for hobby rocketry may be found under the Aerotech® brand (available from RCS Rocket Motor Components, Cedar City Utah) for either or both the single use or limited re-use types. Limited Use RMS™ or LU RMS™ as well as Loadable Motor System™ or MR-LMS™ or SU or SU-LMS™ system are brands also used (also available from RCS). An RMS-Plus™ delay element (also from RCS) may also be used.

Note, loadability (whether for single or a controlled number of multiple uses) in the fashion here described may assist in packaging pre-defined and thus regulatory compliant quantities and/or sizes of propellant loads and/or other pyrotechnics such as delays and/or ejection charges. This may be due to the fixed motor size created by a pre-formed casing with one pre-affixed end closure, aft or fore; the maximum amount of propellant (and other combustibles), then being fixed as well.

Thus, either or both of component parts or a kit may be provided by a manufacturer or distributor to achieve the combination or combinations hereof. A component may be a housing with a fore or aft closure affixed. Another cooperative component therewith would be the other of the closures, not priorly affixed. Propellant in appropriate size/quantity may be a further component. A kit could include each of these and perhaps also instructions for assembly and/or use.

Figure 11:
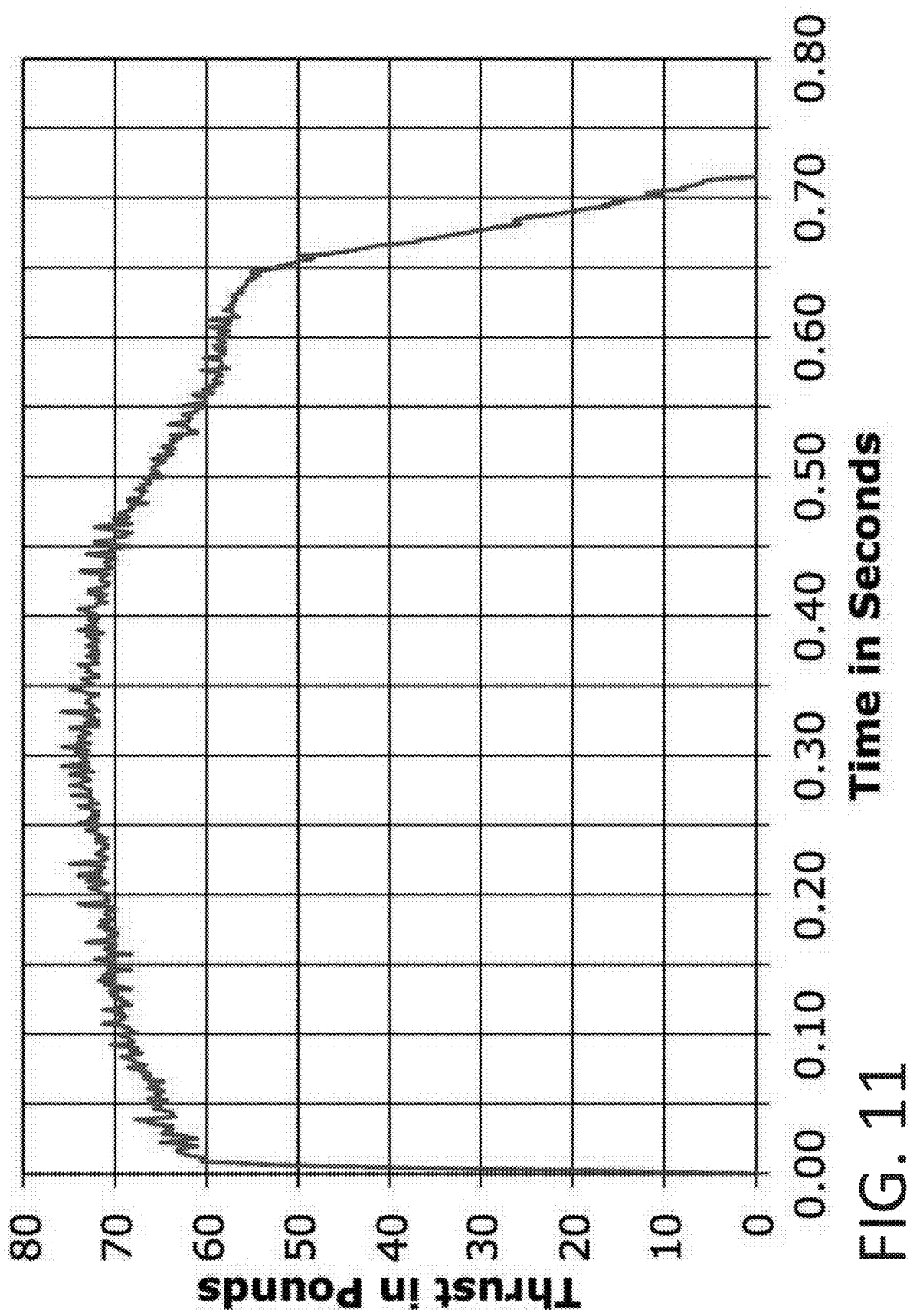
FIG. 11 is a typical time-thrust curve of a rocket motor hereof.

A typical Time-Thrust Curve is shown in FIG. 11. Thrust is shown in pounds, time in seconds. An AeroTech® rocket motor, MR-LMS™ 29/120 casing; 29 millimeters (mm) with White Lightning™ propellant was used. Casing data included: Motor Diameter—1.125 inches (29 mm); Motor Length—4.875 inches (a few mm more than 120 mm); Casing Weight—49 g (0.108 lb) Loading Kit Used—G79 W/L. Total Impulse (Max.)—112 N-sec; Propellant Weight—60.0 g (0.132 lb); Loaded Motor Wt.—125 g (0.275 lb).

Before beginning assembly and/or use of a rocket and rocket motor hereof; it may be noted that the illustrations and sequence of assembly may be important. Damaged parts should not be used. Modifications of the rocket motor or of the motor casing or the reload kit parts could result in motor failure, and could lead to the destruction of both the rocket and motor. Reload kits and/or other parts may be designed specifically for use in a particular motor casing. Use of imitation components may destroy the motor, rocket and payload. Many parts have been designed for one use only and must be discarded after firing. In many cases, this may include the forward closure, liner and o-rings. Reuse of these components can result in motor failure during subsequent operation. In activities involving model rockets, the safety code of the National Association of Rocketry (NAR) may provide illumination.

Alternative implementations abound. As mentioned, it may be that the forward closure or bulkhead 21 is substantially integral with the housing 11 rather than the aft closure 12 being so. Then, after loading internal propellant 16 (typically with a liner 17), such a discrete aft closure 12 may be subsequently attached to the housing 11. In such case, this could also be either limited re-use or single use, thus, such an aft closure 12 may be attached to the housing either with epoxy, or other adhesive, for substantially permanent affixation, and thus single use; or, with an O-ring and a greased connection, screwed or otherwise connected to assure a sufficient seal, though being openable for re-use. In such an exemplar, a delay charge arrangement may be used as well, being insertable into the fore closure typically prior to insertion of propellant; however, it may prove less simple with a fixed fore closure to insert such a delay charge 26 with associated hardware (o-ring 25, insulator 24, spacer 27, separator 22) in and through the length of the rocket motor housing 11. An alternative here is to use no delay, or a different kind of delay, as for example an electronic (timing, altitude or speed or g-force sensing) delay. Note, such alternative delays (or no delays) could be used with an affixed aft closure system as shown in FIGS. 1-9, as well. Other ejection mechanisms (or lack thereof), other than black powder charges disposed in a fore closure ejection well, may be used as well; of particular note, these could be disparate from the motor, and otherwise controlled or effectuated. In disparate or non-existent delay and/or ejection mechanism situations, the rocket motor 10 may be simplified elementally to a housing or casing 11, an aft closure 12 with nozzle 14, and a fore closure 21 (in such instance, the fore closure having no openings, and serving substantially the sole purpose of closing the fore end of the rocket motor). The form defining a propellant combustion chamber in the housing 11, between the fore and aft closures to direct exhaust gases through the nozzle 14. And, in a loadable, single use or limited re-use form as described herein, the housing 11 may have either the aft closure or the fore closure integral therewith or permanently or substantially permanently affixed thereto. The other of the aft and fore closure then being connectable to the housing either in a relatively permanent fashion (e.g., epoxy) for single use, or removably attachable for re-use.

Alternatives for connection of any two or more of the elements together may be used. For example the forming of a substantially permanent pre-connected one end closure housing (e.g., the aft closure as shown, or the fore closure in an alternative implementation) may be achieved through integral formation as by molding together, or may be achieved through later affixation, as for example, by welding, press fitting, or through a number of alternative affixation agents, methods or devices, including but not limited to adhesive agents or screwed or clipped together arrangements. Some similar and some of the same alternatives may be available also for the affixation of the merely connectable closure, such closure to be connected after assembly of the propellant within the housing/combustion chamber. Thus, though epoxy is described for the single use final assembly affixation agent, other adhesives and/or other devices may be used in the alternative. Similarly, the affixation of other elements or devices together may be through alternative agents, methods or devices not specifically described here. For example, though the ejection cap 29 is shown press-fit in place, other securing methods or agents, such as an adhesive may be used instead. The rubber band affixation of the igniter is but one of many methods for fixing the igniter in place; adhesives or mechanical connection structures could be used.

No size or scale or material limitations are intended by the foregoing description, though hobby rocketry would indicate some preferences. Different materials might be chosen dependent upon size or scale of the rocket motor; however, generally, materials resistant to the pressures and temperatures associated with combustion gas generation in a rocket motor would be preferred. A frangible nozzle 14 may also be used to relieve pressures in excess of those desired for a particular use, the frangibility not depending upon whether the aft closure and nozzle are integrally formed with the casing or are affixed later (permanently or removably).

From the foregoing, it is readily apparent that new and useful embodiments of the present systems, apparatuses and/or methods have been herein described and illustrated which fulfill numerous desiderata in remarkably unexpected fashions. It is, of course, understood that such modifications, alterations and adaptations as may readily occur to the artisan confronted with this disclosure are intended within the spirit of this disclosure which is limited only by the scope of the claims appended hereto.

What is claimed is:

1. A thrust ring comprising
   a centrally hollow disk or ring structure with an annular indentation or groove defining or defined by an inner wall and an outer wall,
   a rocket motor housing or casing being received in the annular indentation or groove between the inner and outer walls such that;
   the inner wall is wholly disposed radially within the rocket motor housing and the outer wall is wholly disposed radially outside the rocket motor housing and configured to engage and transmit thrust to a rocket housing apart from the rocket motor housing.

2. A thrust ring according to claim 1 the annular indentation or groove being disposed between one or both:

the inner and outer walls; and an inner ring and outer ring.

3. A thrust ring according to claim 1 one or both the outer wall being configured to fit on the outside of the rocket motor casing and the inner wall being configured to fit a space between the rocket motor casing and a nozzle.

4. A thrust ring according to claim 1 the inner wall having one or both a slight angle or angular portion in the inner wall;

the slight angle defined relative to the longitudinal axis of a rocket motor.

5. A thrust ring according to claim 4 the slight angle being surrounded by and attached using an adhesive or potting compound creating a physical restriction that prevents the thrust ring from being ejected under pressure.

6. A thrust ring according to claim 4 the slight angle being an approximate 2-14 degree angular disposition.

7. A thrust ring according to claim 1 for use with a rocket motor for at least one of single use or limited re-use.

8. A thrust ring according to claim 1 the inner having one or more holes, notches, a hook-like structure or a reverse taper to create a physical restriction that prevents the thrust ring from being ejected under pressure.

9. A rocket motor including a thrust ring according to claim 1, the rocket motor comprising:

the rocket motor housing being adapted to contain propellant; and, an aft closure with a nozzle defined therein and the thrust ring.

10. A rocket motor including a thrust ring according to claim 1, the rocket motor comprising:

the rocket motor housing being adapted to contain propellant;

an aft closure with a nozzle defined therein and the thrust ring, the aft closure being one of connected or connectable to the rocket motor housing;

a forward closure being one of connected or connectable to the rocket motor housing;

one or both of the aft closure and the forward closure being connectable to the rocket motor housing in manner adapted for one or both of single use or limited re-use.

11. A rocket motor including a thrust ring according to claim 1, one or the other of an aft closure and a forward closure being one or both of substantially permanently connected to or integrally formed with the rocket motor housing.

12. A rocket motor including a thrust ring according to claim 1 one or the other of an aft closure and a forward closure being one or both of substantially permanently connected to or integrally formed with the rocket motor housing; and the other of the forward closure and aft closure not connected to or formed with the rocket motor housing being connectable thereto to enclose propellant to be disposed therein.

13. A rocket motor including a thrust ring according to claim 1 including an aft closure that is one or both of substantially permanently connected to or integrally formed with the rocket motor housing.

14. A rocket motor including a thrust ring according to claim 1 including a forward closure that is connectable to the housing; and, the forward closure being connectable to the housing after disposition of propellant within the rocket motor housing.

15. A rocket motor including a thrust ring according to claim 1 a forward closure being one or both of substantially permanently connected to or integrally formed with the rocket motor housing.

16. A rocket motor including a thrust ring according to claim 1 an aft closure being connectable to the rocket motor housing; and, the aft closure being connectable to the rocket motor housing after disposition of propellant within the rocket motor housing.

17. A kit including a thrust ring according to claim 1 further comprising instructions for one or both of assembly or use.

18. A rocket motor including a thrust ring according to claim 1 the single use being provided by one or more of:

an o-ring;

a substantially permanent adhesive or mechanical seal; and, an epoxy seal.

19. A method for assembly of a rocket motor including a thrust ring according to claim 1 for limited re-use or single use including:

assembling the rocket motor housing with propellant and an aft closure and a forward closure and a thrust ring according hereto;

the one or both of the aft closure and the forward closure being connectable to the housing n manner adapted for one or both of limited re-use or single use.

20. A method for assembly of a rocket motor including a thrust ring according to claim 1 for limited re-use or single use including:

obtaining the rocket motor casing with either one of end closure, an aft end closure or a forward end closure, affixed thereto;

loading propellant in the rocket motor casing; and, attaching a previously un-affixed end closure, aft or forward, to the rocket motor casing;

affixing the thrust ring to one or the other or both of the rocket motor casing and the aft end closure.

* * * * *